United States Patent
Chatterjee et al.

(10) Patent No.: US 11,985,674 B2
(45) Date of Patent: May 14, 2024

(54) DATA AND CONTROL TRANSMISSION ENHANCEMENTS FOR NEW RADIO (NR)

(71) Applicant: APPLE INC., Cupertino, CA (US)

(72) Inventors: Debdeep Chatterjee, San Jose, CA (US); Sergey Panteleev, Nizhny Novgorod (RU); Fatemeh Hamidi-Sepehr, Santa Clara, CA (US); Toufiqul Islam, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 604 days.

(21) Appl. No.: 17/265,422

(22) PCT Filed: Aug. 9, 2019

(86) PCT No.: PCT/US2019/045993
§ 371 (c)(1),
(2) Date: Feb. 2, 2021

(87) PCT Pub. No.: WO2020/033884
PCT Pub. Date: Feb. 13, 2020

(65) Prior Publication Data
US 2021/0307051 A1 Sep. 30, 2021

Related U.S. Application Data

(60) Provisional application No. 62/739,071, filed on Sep. 28, 2018, provisional application No. 62/717,696, filed on Aug. 10, 2018.

(51) Int. Cl.
*H04W 4/00* (2018.01)
*H04W 72/0446* (2023.01)
(Continued)

(52) U.S. Cl.
CPC ....... *H04W 72/23* (2023.01); *H04W 72/0446* (2013.01); *H04W 72/0453* (2013.01); *H04W 72/1273* (2013.01)

(58) Field of Classification Search
CPC ............ H04W 72/23; H04W 72/0446; H04W 72/0453; H04W 72/1273
(Continued)

(56) References Cited

U.S. PATENT DOCUMENTS 10,383,035 B2 * 8/2019 Sheng .................. H04W 48/12
11,006,397 B2 * 5/2021 Xiong .................. H04L 1/0026
(Continued)

FOREIGN PATENT DOCUMENTS

| WO | 2015046830 A1 | 4/2015 |
| WO | 2016119232 A1 | 8/2016 |
| WO | 2018031083 A1 | 2/2018 |

OTHER PUBLICATIONS

3GPP TS 38.214, "3rd Generation Partnership Project; Technical Specification Group Radio Access Network; NR; Physical layer procedures for data (Release 15)", V15.2.0, Jun. 29, 2018, 95 pages.
(Continued)

*Primary Examiner* — Marceau Milord
(74) *Attorney, Agent, or Firm* — Dorsey & Whitney LLP

(57) ABSTRACT

Technology for a user equipment (UE) operable for dynamic downlink (DL) control and data repetition for new radio (NR) ultra-reliable low-latency communication (URLLC) is disclosed. The apparatus can comprise one or more processors. The one or more processors can be configured to: decode a value of 5 a repetition number indicator from downlink control information (DCI); decode information on a physical downlink shared channel (PDSCH) transmission; and decode information on a number of repeated PDSCH transmissions, wherein the number of repeated PDSCH transmissions is equal to the value of the repetition number indicator.

20 Claims, 12 Drawing Sheets

(51) Int. Cl.
*H04W 72/0453* (2023.01)
*H04W 72/1273* (2023.01)
*H04W 72/23* (2023.01)

(58) Field of Classification Search
USPC .......................................................... 370/329
See application file for complete search history.

(56) References Cited

U.S. PATENT DOCUMENTS

| | | | | |
|---|---|---|---|---|
| 11,044,746 B2 * | 6/2021 | Chien | | H04L 1/1861 |
| 11,528,099 B2 * | 12/2022 | Ren | | H04L 1/1896 |
| 11,546,089 B2 * | 1/2023 | Peng | | H04L 1/0059 |
| 11,575,554 B2 * | 2/2023 | Davydov | | H04B 7/0626 |
| 11,589,337 B2 * | 2/2023 | Zhu | | H04L 1/08 |
| 11,617,193 B2 * | 3/2023 | Munier | | H04W 72/23 |
| | | | | 370/329 |
| 11,653,365 B2 * | 5/2023 | Babaei | | H04W 76/38 |
| | | | | 370/336 |
| 2015/0085717 A1 * | 3/2015 | Papasakellariou | | H04W 48/12 |
| | | | | 370/280 |
| 2015/0181576 A1 * | 6/2015 | Papasakellariou | | H04L 1/0072 |
| | | | | 370/329 |
| 2017/0171841 A1 | 6/2017 | Chen et al. | | |
| 2017/0265193 A1 * | 9/2017 | Wang | | H04W 72/0453 |
| 2017/0311182 A1 * | 10/2017 | Tenny | | H04W 76/27 |
| 2017/0353976 A1 * | 12/2017 | Yerramalli | | H04W 74/004 |
| 2018/0007667 A1 * | 1/2018 | You | | H04L 5/0051 |
| 2018/0027582 A1 * | 1/2018 | Yerramalli | | H04W 74/085 |
| | | | | 370/336 |
| 2019/0261361 A1 * | 8/2019 | Xiong | | H04W 72/02 |
| 2019/0261454 A1 * | 8/2019 | Xiong | | H04L 5/1469 |
| 2019/0268935 A1 * | 8/2019 | Talarico | | H04L 1/1822 |
| 2019/0268970 A1 * | 8/2019 | Chang | | H04W 88/10 |
| 2019/0313426 A1 * | 10/2019 | Lin | | H04L 1/0035 |
| 2019/0349116 A1 * | 11/2019 | Hosseini | | H04W 72/23 |
| 2020/0136777 A1 * | 4/2020 | He | | H04L 5/0007 |
| 2020/0137834 A1 * | 4/2020 | Xiong | | H04L 1/0026 |
| 2023/0189226 A1 * | 6/2023 | Yang | | H04W 72/21 |
| | | | | 370/329 |

OTHER PUBLICATIONS

PCT/US2019/045993, International Search Report and Written Opinion, dated Dec. 3, 2019, 9 pages.
Samsung, "Discussion on PDSCH repetition", R1-1806697, 3GPP TSG RAN WG1 Meeting #93, Busan, Korea, Agenda Item 6.2.8.1 ,May 21-25, 2018 ,3 pages.
ZTE,"Remaining issues on PDSCH repetition for LTE URLLC", R1-1806769, 3GPP TSG RAN WG1 Meeting #93, Busan, Korea, Agenda 6.2.8.1, May 21-25, 2018, 3 pages.
Huawei, HiSilicon, "Blind/HARQ-less Repetition for Scheduled DL-SCH Operation", R1-1805867, 3GPP TSG RAN WG1 Meeting #93, Busan, Korea, Agenda Item 6.2.8.1, May 21-25, 2018, 6 pages.
Qualcomm Incorporated, "Beam management for NR", R1-1807341, 3GPP TSG-RAN WG1 Meeting 93, Busan, Korea, Agenda Item 7.1.2.2.3, May 21-25, 2018, 11 pages.
ZTE, Sanechips, "Discussion on PDSCH repetition for LTE URLLC", R1-1803962, 3GPP TSG RAN WG1 Meeting #92bis, Sanya, China, Agenda Item 6.2.8.1, Apr. 16-20, 2018, 4 pages.

* cited by examiner

| Field: | DCI format 0_0/0_1 | DCI format 1_0 | DCI format 1_1 |
|---|---|---|---|
| HARQ ID | set to all '0's | set to all '0's | set to all '0's |
| RV | set to '00' | set to '00' | For the enabled TB: set to '00' |

FIG. 2a

| Field: | DCI format 0_0 | DCI format 1_0 |
|---|---|---|
| HARQ ID | set to all '0's | set to all '0's |
| MCS | set to all '1's | set to all '1's |
| Resource block assignment | set to all '1's | set to all '1's |
| RV | set to '00' | set to '00' |

FIG. 2b

| Parameters | Type 1 | Type 2 |
|---|---|---|
| Periodicity | RRC | RRC |
| Slot offset | RRC, with respect to SFN = 0 | L1, with respect to DCI reception |
| Time domain resource allocation | RRC | L1 |
| Frequency domain resource allocation | RRC | L1 |
| UE-specific DMRS configuration | RRC | L1 |
| MCS/TBS value | RRC | L1 |
| Power control related parameters | RRC | RRC |
| Number of repetitions {1,2,4,8} | RRC | RRC |
| RV cycling sequence | RRC | RRC |

FIG. 3

DATA AND CONTROL TRANSMISSION ENHANCEMENTS FOR NEW RADIO (NR)

RELATED APPLICATIONS

The present application is a national stage filing under 35 U.S.C. § 371 of International Patent Application No. PCT/US2019/045993, filed Aug. 9, 2019, which claims the benefit of U.S. Provisional Patent Application No. 62/717,696 filed Aug. 10, 2018 and U.S. Provisional Patent Application No. 62/739,071 filed Sep. 28, 2018, the entire specifications of which are hereby incorporated by reference in their entirety for all purposes.

BACKGROUND

Wireless systems typically include multiple User Equipment (UE) devices communicatively coupled to one or more Base Stations (BS). The one or more BSs may be Long Term Evolved (LTE) evolved NodeBs (eNB) or new radio (NR) NodeBs (gNB), next generation node Bs (gNB), or new radio base stations (NR BS) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2a depicts functionality of downlink control information (DCI) fields in accordance with an example;

FIG. 2b depicts functionality of downlink control information (DCI) fields in accordance with an example;

FIG. 3 depicts functionality of parameters for configured grant in accordance with an example;

Figure 1:
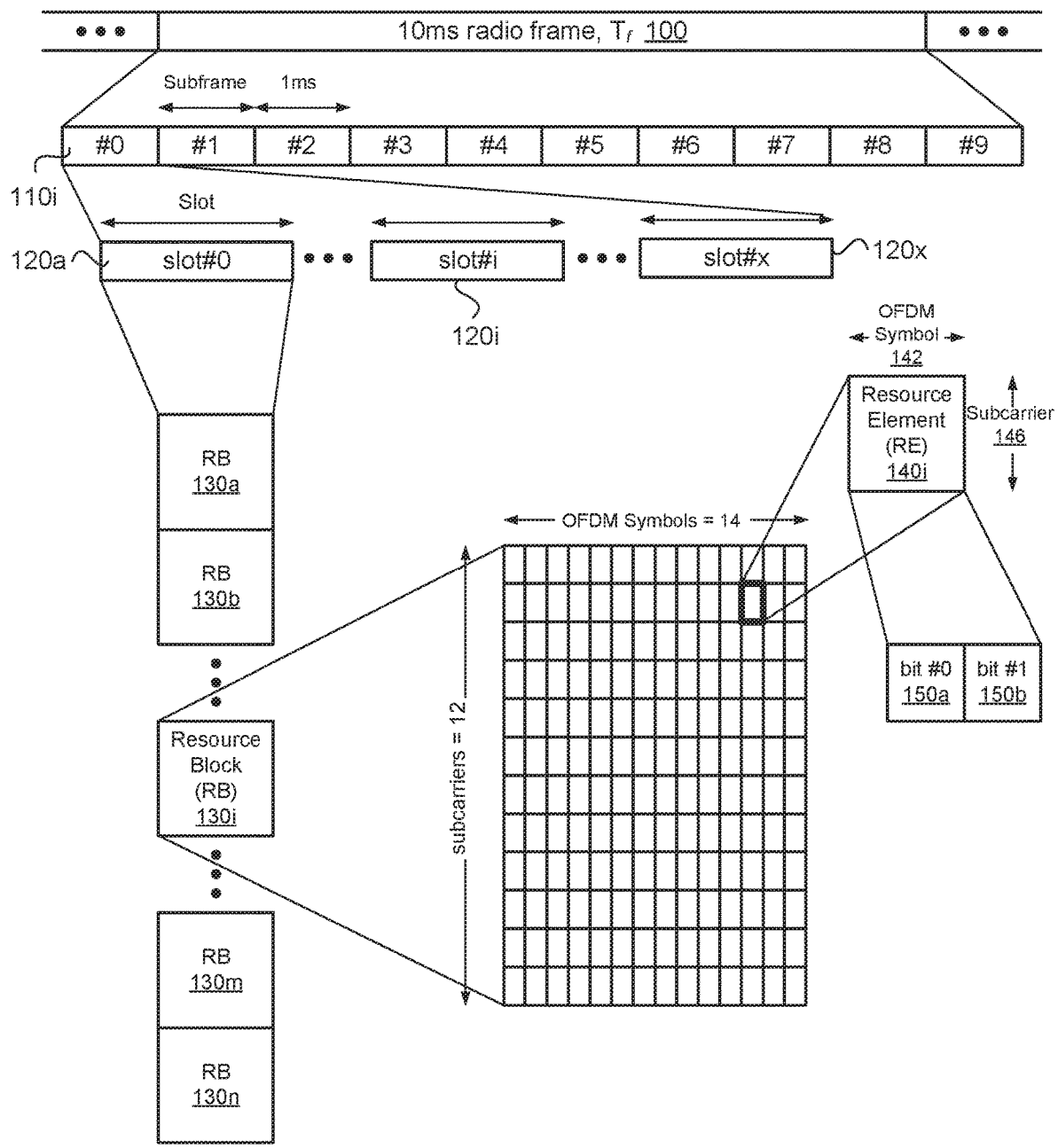
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Mobile communication has evolved significantly from early voice systems to today's sophisticated integrated communication platform. The next generation wireless communication system, 5G, or new radio (NR) may provide access to information and sharing of data anywhere and anytime by various users and applications. NR is expected to be a unified network or system that can fulfill vastly different and sometime conflicting performance dimensions and services. Such multi-dimensional aspects can involve different services and applications. In general, NR can evolve based on Third Generation Partnership Project (3GPP) long term evolution (LTE)-Advanced with potential Radio Access Technologies (RATs) to enrich people lives with simpler and more seamless wireless connectivity solutions. NR may enable everything connected by wireless and deliver fast content and services.

In LTE Higher-Reliability and Low-Latency Communication (HRLLC), blind (e.g., hybrid automatic repeat request (HARQ)-less) physical downlink shared channel (PDSCH) repetition can increase the probability of successful decoding of the downlink (DL) assignment. Further DL assignments can be transmitted in the transmission time intervals (TTIs) or shortened TTIs (sTTIs) following the TTI or sTTI in which a DL assignment for K PDSCH transmissions has been transmitted, wherein K is a positive integer. Blind or HARQ-less PDSCH repetitions can be configured by radio resource control (RRC) signaling. Repetition-based PDSCH reception can be a user equipment (UE) capability.

In one example, dynamic signaling of the repetitions (in which the physical downlink control channel (PDCCH) can be repeated to indicate the countdown of the number of the remaining PDSCH repetitions). For PDSCH repetition, a field of 2 bits can be amended to the PDSCH related downlink control information (DCI). PDSCH repetitions associated with a single DL assignment can use the same resource block (RB) allocation. The number of PDSCH transmissions, K, associated with the PDCCH starting with the current TTI can include the following values and can be indicated in a 2-bit DCI field as depicted in Table 1:

TABLE 1

| DCI bit field | Value of k for subframe, slot and sub-slot |
|---|---|
| 00 | 1 |
| 01 | 2 |
| 10 | 3 |
| 11 | a value configured over RRC from {4, 6} |

In another example, the countdown and indication of the number of PDSCH repetitions can be aligned with the partial sTTI durations and the coupling between the control channel and sTTI duration (e.g., assuming an sTTI in which there is a PDCCH opportunity every 2 symbols, wherein each 2-symbols carries a PDSCH and a PDCCH).

In another example, the UE can discard any further DL assignment cyclic redundancy code (CRC)-scrambled with cell radio network temporary identifier (C-RNTI) in a shortened TTI or TTI in a serving cell, wherein a PDSCH that is part of a window of K transmissions is received. If the UE uses DCI scheduling repetitions, during the reception of repetitions the UE may not monitor any later DCI (i.e. DCI overlapping with a previously scheduled PDSCH). Any DCI transmission during the repetitions may not interrupt UE procedure, which can preclude the changing of the configurations (e.g., MCS in the next DCI transmission). The UE may not receive a receive/transmit (RX/TX) grant during repetitions.

In another example, the DCI contents can include the x most significant bit (MSB) of the 5-bit modulation and coding scheme (MCS) field for PDSCH repetitions where K>1, and x is a positive integer. The value of x can be configured in the range {0,1} to enhance the positive false alarm rate (FAR) performance. The FAR performance in LTE can be inadequate because the CRC length can be 16-bit.

In another example, for time division duplexing (TDD), if a UE is scheduled with K repetitions for slot PDSCH, the UE can assume the PDSCH is present in the next available K DL slots (i.e. UL slots are not counted in the repetition count). Slot and sub-slot PDSCH repetition across subframe boundaries can be supported. If configured for slot or sub-slot PDSCH, a single DCI format can be used to schedule slot or sub-slot PDSCH.

In another example, for TDD, if a UE is scheduled with K repetitions for subframe PDSCH, the UE can assume the PDSCH is present in the next available K DL subframes or flexible subframes (i.e. UL subframes are not counted in the repetition count). If configured for subframe PDSCH, the UE can continue to monitor for DCI Format 1A and the DL transmission Mode™ specific DCI format. The field can be included in DCI format 1A on a UE-specific search space (USS).

In another example, for slot or sub-slot PDSCH repetition, the rate-matching relating to SPDCCH resources for the PDSCH transmissions within a repetition window can use the rate-matching relating to SPDCCH resources for the first PDSCH transmission of the repetition window.

In another example, for PDSCH repetitions, different redundancy versions (RV) can be used in different PDSCH transmissions within the repetition window (i.e. RV cycling can be supported). For PDSCH repetitions and RV cycling, the RV field in the DCI scheduling a repetition sequence of K PDSCH transmissions can identify the starting RV in the cycling sequence that can be used for the first transmission of PDSCH within the repetition window. The RV cycling sequence applied for PDSCH repetition can be configured by higher layer signaling and selected between {0, 0, 0, 0} or {0, 2, 3, 1}.

In another example, the number of HARQ processes for PDSCH repetition applicable when K>1 can be configured between 1 to the maximum number of DL HARQ processes. The UE can report HARQ feedback with the timing given by the last PDSCH repetition.

Legacy eNBs are not configured to identify if the UE decoded the first DCI; therefore keeping DCI content the same can enhance efficiency, unless the number of repetitions is communicated dynamically. A PDCCH acknowledgment (ACK) should not be used to indicate successful DCI decoding because the system performance can be limited by the feedback channel rather than the PDCCH channel.

Dynamic repetitions can be beneficial with limited bandwidth (BW) operation because the decoding latency and power consumption can be reduced. The UE can decode the PDSCH faster (with fewer than the transmitted number of repetitions) compared to the case wherein the PDSCH is transmitted using an equivalent number of symbols. To facilitate low latency, UL (e.g., PUCCH) resources corresponding to each of the repetitions can be used.

When the symbols for transmissions include gaps (e.g., a TDD case with UL symbols located in between DL symbols), then dynamic repetitions can increase scheduling flexibility because the gNB can start the first PDSCH repetition faster. In another example, multiplexing of different services within a UE, i.e. eMBB and URLLC services, can be enabled by using dynamic repetitions.

In one example, a user equipment (UE) can be configured for dynamic downlink (DL) control and data repetition for new radio (NR) ultra-reliable low-latency communication (URLLC). The UE can comprise one or more processors. The one or more processors can be configured to decode, at the UE, a value of a repetition number indicator from downlink control information (DCI). The one or more processors can be configured to decode, at the UE, information on a physical downlink shared channel (PDSCH) transmission. The one or more processors can be configured to decode, at the UE, information on a number of repeated PDSCH transmissions, wherein the number of repeated PDSCH transmissions is equal to the value of the repetition number indicator.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110i that are each 1 ms long. Each subframe can be further subdivided into one or multiple slots 120a, 120i, and 120x, each with a duration, $T_{slot}$, of 1/μ ms, where μ=1 for 15 kHz subcarrier spacing, μ=2 for 30 kHz, μ=4 for 60 kHz, μ=8 for 120 kHz, and u=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130*a*, 130*b*, 130*i*, 130*m*, and 130*n* based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140*i* can transmit two bits 150*a* and 150*b* of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the NR BS to the UE, or the RB can be configured for an uplink transmission from the UE to the NR BS.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

In one example, a compact DCI format for URLLC services can be configured for a PDCCH. In some use cases a scheduling approach including dynamic scheduling, semi-persistent scheduling (SPS), or Type 2 configured-grant cases can be configured with a compact DCI. In another example, Type 1 UL data transmission without grant can be based on RRC configuration without layer 1 (L1) signaling. In another example, Type 2 UL data transmission without grant can be based on both RRC configuration and L1 signaling to activate or deactivate for UL data transmission without grant.

In another example, the proceeding DCI fields can be configured to differentiate activation, as depicted in Table 2a and FIG. 2*a*, and deactivation or release, as depicted in Table 2b and FIG. 2*b*:

TABLE 2a

| Field: | DCI format 0_0/0_1 | DCI format 1_0 | DCI format 1_1 |
|---|---|---|---|
| HARQ ID | set to all '0's | set to all '0's | set to all '0's |
| RV | set to '00' | set to '00' | For the enabled TB: set to '00' |

TABLE 2b

| Field: | DCI format 0_0 | DCI format 1_0 |
|---|---|---|
| HARQ ID | set to all '0's | set to all '0's |
| MCS | set to all '1's | set to all '1's |
| Resource block assignment | set to all '1's | set to all '1's |
| RV | set to '00' | set to '00' |

In another example, different parameters for Type 1 and Type 2 UL configured grant (CG) can be configured as depicted in Table 3 and FIG. 3.

TABLE 3

| Parameters | Type 1 | Type 2 |
|---|---|---|
| Periodicity | RRC | RRC |
| Slot offset | RRC, with respect to SFN = 0 | L1, with respect to DCI reception |
| Time domain resource allocation | RRC | L1 |
| Frequency domain resource allocation | RRC | L1 |
| UE-specific DMRS configuration | RRC | L1 |
| MCS/TBS value | RRC | L1 |
| Power control related parameters | RRC | RRC |
| Number of repetitions {1, 2, 4, 8} | RRC | RRC |
| RV cycling sequence | RRC | RRC |

1. Dynamic DL Control and Data Repetition for NR URLLC

In another example, the below examples, described with a dynamically scheduled PDSCH, can also be applied to a PDSCH scheduled via DL SPS (using configured scheduling radio network temporary identifier (CS-RNTI)), wherein the corresponding DCI can be the activation DCI.

A. Indication and Configurations of the Repetitions

In one example, dynamic PDCCH or PDSCH repetitions can be configured within a slot (e.g., using mapping type B) or across slots.

In another example, a DCI field for DCI format 1_1 can be configured for the dynamic indication of the number of repetitions. The UE can be configured via UE-specific RRC signaling to enable dynamic indication of repetitions of PDSCH.

In another example, repeated copies of the DCI in PDCCH transmissions can include dynamic indication of the remaining number of repetitions, starting from a maximum number of repetitions K (a positive integer, e.g., 4 or 8) which can be the first indicated number of repetitions. In another example, the maximum number of repetitions can be RRC configured.

In another example, the dynamic number of repetitions or the remaining number of repetitions can be signaled ranging from 1 (i.e. no repetitions) to the maximum value K to enable a countdown of the repetitions in the repeated DCIs. The set of values [1, 2, 4, 8] configured for PDSCH repetitions (with a single DCI transmission with semi-statically configured repetition level) may not be configured for a HARQ-less PDCCH or PDSCH repetition scheme. In one example, the set of consecutive values [1, 2, 3, 4] can be supported.

In one example, subsequent DCIs that schedule the same transport block (TB) can indicate a repetition number that is less than the repetition number indicated in the scheduling DCI, wherein the indicated repetition number in the subsequent DCIs can be independent from the repetition number indicated in the DCI scheduling initial transmission.

In another example, different transmission configuration indicator (TCI)-state/quasi-co-location (QCL) assumptions can be configured for transmission of different PDCCH or PDSCH copies, wherein the TCI-state for PDSCH may be associated with the PDCCH carrying the particular scheduling assignment. Each repetition of the PDCCH can be mapped to different control resource sets (CORESETs) with different TCI-state or QCL associations. The repetitions of the PDCCH can carry DCI formats that can indicate one or more of: different numbers of PDSCH repetitions, or different TCI-states. Different copies of PDCCH and/or PDSCH can be transmitted from different transmission reception points (TRPs).

In another example, multi-TRP transmissions can be configured differently for frequency range 1 (FR1) and frequency range 2 (FR2) operations (e.g., UE radio frequency (RF) assumptions and number of antennas). For FR2 operation with multi-panel, the UE can monitor and simultaneously receive on beams with different QCL-type D configuration using two different panels. The preceding examples can be configured for FR2 operation with repetitions of the PDCCH and the PDSCH that can occur with time-domain overlaps of one or more orthogonal frequency division multiplexing (OFDM) symbols. In another example, for UEs with a single antenna panel, the PDCCH and PDSCH repetitions associated with different references for Type D QCL may not overlap in the time-domain with an OFDM symbol.

In another example, a fixed redundancy version (RV) sequence pattern (i.e. RV cycling) can be supported for PDSCH transmissions within the repetition window, wherein the RV cycling sequence can be predefined by higher-layers or specified as 0, 2, 3, 1 (e.g., for slot aggregation). In another example, the RV corresponding to different transmissions can be dynamically indicated, and can be performed for each transmission or retransmission individually. In another example, the RV for the first PDSCH in a sequence of repeated PDSCH transmissions can be indicated dynamically by the corresponding scheduling DCI and a specified sequence of RVs for the subsequent repetitions can be cycled through starting from the RV indicated for the first transmission.

In another example, predefined mapping rules can be configured. For PDSCH transmissions with dynamically indicated number of repetitions, the first transmission can be configured to use RV0 and subsequent repetitions can cycle through a predetermined (e.g., 0, 2, 3, 1) or configured sequence to avoid using a DCI field to separately indicate the number of repetitions and the RV. The mapping can also be defined between the sequence of repetitions and the RV sequence. When configured with dynamic indication of number of repetitions, the RV indicator field in the DCI formats 1_0 and 1_1 can be configured to indicate the number of repetitions from one of the set {1, 2, 3, 4}, the set {1, 2, 4, 8}, or a set of higher-layer configured values.

In another example, dynamic repetitions of data channels and repetitions of PDCCH can enable multiplexing of different services within a UE (i.e. eMBB and URLLC services). The eMBB service can be scheduled with single transmission and the URLLC services can be scheduled with multiple transmissions (e.g., using shared DCI formats).

In another example, when configured with both slot aggregation via higher layers and dynamic indication of number of repetitions for PDSCH, the dynamically indicated value can override the value of the slot aggregation factor configured by UE-specific RRC signaling.

In another example, the number of repetitions for PDSCH can be encoded by the time-domain resource assignment table that can be configured via UE-specific RRC signaling. In another example, the corresponding bit-field in the DCI format can indicate the number of repetitions by the time domain resource assignment information. The RRC-configured time domain resource allocation/assignment (RA) table can include: information on starting symbol of PDSCH; duration of the PDSCH and the PDSCH mapping type; and the number of repetitions for the PDSCH.

In another example, the number of repetitions can be jointly encoded with some of the start and length indicator value (SLIV) fields for the start and length of the PDSCH allocation indication. In another example, combinations of starting symbol, length and number of repetitions of PDSCH can be configured via higher layers to generate the time-domain resource assignment table.

In another example, the dynamically indicated value can be configured with slot aggregation via higher layers and dynamic indication of number of repetitions for PDSCH. The dynamically indicated value can over-ride the value of the slot aggregation factor configured by UE-specific RRC signaling for combinations of starting symbol and duration of the PDSCH as indicated via the time domain resource assignment field in the scheduling DCI. In another example, for other combinations of starting symbol, duration, or PDSCH mapping type, the semi-statically configured PDSCH slot-aggregation can be configured. In another example, semi-statically configured slot aggregation or dynamically indicated number of repetitions can be indicated dynamically and explicitly in the scheduling DCI.

B. UE Functionality

In one example, the UE may not combine (e.g., soft-combining) the information from different received copies. In another example, the UE can skip monitoring and reception of the subsequent copies upon detection of one of the copies.

In another example, the UL (PUCCH) resources corresponding to the repetitions can be configured for a corresponding HARQ-ACK transmission (instead of a single PUCCH resource for HARQ-ACK transmission after the last repetition) when the UE decodes the PDSCH with fewer than the transmitted number of repetitions.

In another example, a rate-matching assumption can be defined when receiving the PDSCH retransmissions (e.g., whether any rate-matching can be expected for later DCI resources for PDSCH transmissions within a repetition window).

In another example, the UE can continue PDCCH monitoring at least for UL grant information. In another example, the UE can continue the PDCCH monitoring when PDSCH retransmissions arrive.

In another example, the UE can be configured to rate-match the PDSCH repetitions for successful PDCCH candidates as the PDSCH retransmissions arrive. In another example, the UE can rate-match the PDSCH retransmissions with the CORESET.

In another example, the UE can discard further DL assignments scrambled with C-RNTI or a different RNTI (e.g., modulation and coding scheme radio network temporary identifier (MCS-C-RNTI) or CS-RNTI) during the arrival of PDSCH retransmissions (e.g., the UE can assume that no further DCI is sent). In one example, the UE may not monitor the later DCIs if an earlier DCI is already decoded.

In another example, the UE can be configured to autonomously retransmit the PUSCH (e.g., in a grant-free manner) if no DCI for retransmission is received (i.e., no indication is received from the gNB for X sub-frames since the transmission of a given HARQ process, wherein X=1 or 2). The UE can be configured with high reliability requirements in which at least one retransmission may be decoded, if a retransmission DCI missed.

In another example, if subsequent DCIs scheduling the same TB indicate a repetition number that is less than the repetition number indicated in the original scheduling DCI, then the indicated repetition number in the subsequent DCI(s) can be independent from the repetition number indicated in the DCI scheduling initial transmission. In another example, the UE can be configured to drop any remaining repetitions of the initial transmission and follow the indication received in the subsequent DCI.

C. Reception of Updated DL Assignment

In another example, when a DCI has scheduled DL transmissions for a given HARQ process, the UE can be configured to receive a subsequent DL assignment for the same HARQ process ID before it transmits the HARQ-ACK/NACK feedback associated with the earlier transmission. Each assignment may have a separate HARQ timeline, and the new data indicator (NDI) in the subsequent assignment may not be toggled.

In another example, the UE can be configured for the DL assignments independently when the HARQ timings of the assignments satisfy the HARQ ordering and the UE can send the ACK/NACK feedback according to the corresponding timelines. In another example, the UE can soft combine the transmissions scheduled by the two DL assignments.

In another example, pipelining can be impacted if soft combining for the same HARQ process ID can be expected (e.g., if the second transmission has to wait longer when the first transmission has not yet completed). In another example, the UE can process both transmissions in parallel and independently (i.e., for demodulation and decoding). In another example, when the UE is configured for soft combining, the UE may not process the second transmission beyond demodulation (i.e. no decoding), and may wait until the soft bits from the first transmission are received. In another example, the first transmission can be decoded, but the UE may be unable to process the second transmission depending on the UE architecture pipelining.

In another example, the minimum PDSCH processing time can be increased by 'd' symbols for a second PDSCH such that the second PDSCH starting symbol occurs (N1–d) symbols from the end of a prior-scheduled PDSCH with the same HARQ process ID (HARQ PID) without toggling of the NDI bit between the two PDSCH assignments. In another example, the UE may not soft-combine the received PDSCHs if the second PDSCH has a starting symbol that occurs (N1–x) symbols from the end of a prior-scheduled PDSCH with the same HARQ PID, wherein x>0. In this example, N1 can be the number of symbols for minimum PDSCH processing time based on the processing capability of the UE.

In another example, the UE can discard the earlier PDSCH reception and terminate the transmission of HARQ feedback upon the reception of a subsequent DL assignment. The UE can be configured with the updated assignment for the same HARQ process if the last symbol of the PDCCH carrying the second DCI with the subsequent DL assignment is received at least N OFDM symbols before the first symbol of the PUCCH. In another example, the UE can carry the HARQ-ACK feedback corresponding to the earlier PDSCH when N=N1. In another example, the updated assignment can shift the DL resource allocation to a later time or update the resource allocation.

In another example, a subsequent assignment can override the earlier transmission, cancel the HARQ feedback, or schedule a new PDSCH assignment. In another example, if the original assignment configures repeated transmissions, a subsequent assignment can cancel repetitions, revise the number of remaining repetitions, or schedule a new assignment.

In another example, a predefined window or set of monitoring occasions can be configured (e.g., upon the end of the earlier PDSCH reception, if the UE receives a subsequent DL assignment, the UE may not transmit the original HARQ-ACK feedback). In this example, a re-scheduling assignment can be received before or while the PDSCH scheduled by the original assignment is received.

In another example, the UE can be configured to monitor for the subsequent DL assignment for a predefined or configured window (e.g., one or more monitoring occasions). If the subsequent assignment is not received within the window, the UE can transmit the HARQ feedback following the original assignment.

In another example, the UE can monitor for a subsequent assignment with a finer monitoring granularity upon detection of a DL assignment. The monitoring periodicity and the time window duration can be configured or predefined, and can be configured by the original monitoring occasion periodicity, symbols, slots, etc.

In another example, the window length can be determined based on the scheduled PDSCH duration (e.g., the UE may not monitor after the PDSCH reception ends).

In another example, the UE can be configured with a default monitoring periodicity and an additional set of DCI configuration parameters corresponding to rescheduling. The configuration can be activated or triggered based on reception of PDSCH or the corresponding DL scheduling DCI, and can be attached to a particular search space.

In another example, a given search space and CORESET can have two monitoring periodicities: (a) a default monitoring periodicity, and (b) a monitoring periodicity when reception of PDSCH or DL scheduling DCI occurs. The additional set of parameters can include a different monitoring periodicity, offset, or pattern relative to the earlier assignment. In another example, monitoring can be triggered after the network schedules a DL data assignment.

In another example, activating additional UE monitoring upon reception of PDSCH or the corresponding DL scheduling DCI can be configured for DL assignment of different HARQ process IDs. In another example, the UE can drop the previous assignment based on the HARQ process.

In another example, a pool of HARQ processes can be based on the revised DL assignment to indicate dynamic monitoring for a subsequent grant. The pool of HARQ processes can be RRC configured.

In another example, an aggregation level can be configured for dynamic adjustment in monitoring. UEs configured by RRC signaling for the dynamic adjustment can assume the use of an aggregation level. In another example, UEs can be configured as part of a BW part configuration whether dynamic adjustment in monitoring is enabled or not.

In another example, if the repetition factor is higher than a threshold (e.g., 4), then the UE can monitor for a subsequent grant with revised monitoring. In this example, the subsequent grant can update or cancel some of the remaining repetitions.

Search Space Set Configuration

In another example, an updated DL assignment can include dynamic adaptation in UE monitoring. Dynamic PDCCH monitoring can be configured to alter, update, or cancel resource assignment by a previous PDCCH. The UE can be configured with S search space sets in a given DL bandwidth part (BWP), wherein the search space set is indexed by S. Updated DL assignment can be configured to be transmitted on at least one search space set. The DCI format for updated DL assignment can include DCI format x-y, wherein x can be 1 for DL assignment and y can be 0 or 1. In another example, x can be 2 if transmitted in a common DCI in a PDCCH for a common PDCCH and y can be an integer greater than or equal to 1 (e.g., 1 or 4).

In another example, for a search space set s for updated DL assignment monitoring, the UE can be configured by a higher layer parameter dci-Formatx-y as part of the configuration of the SearchSpace by higher layers.

In another example, a UE can monitor the search space set s (e.g., for DCI format x-y) after a trigger. In one example, the trigger can include reception of an assignment by the network. In an example, the monitoring pattern within a slot can be configured for the search space set s by the higher layer parameter monitoringSymbolsWithinSlot. In another example, the UE can be configured with a higher layer parameter duration (e.g., a monitoring window) for search space set s, wherein the duration can be indicated in slots or symbols. The parameter duration can be separately configured from the duration parameter. A monitoring offset can indicate the duration start. In one example, the search space set s can be configured with a periodicity that is does not monitor an updated DL assignment. The UE can monitor for DCI format x-y in search space set s over a duration, instead of periodically. In another example, the UE can monitor for DCI format x-y in search space set s based on the configured monitoring periodicity within the time defined by the duration parameter.

In another example, when a UE detects DCI format x-y in one of the monitoring occasions in search space s, the UE can skip monitoring of the remaining occasions within the slot. In another example, the UE can skip monitoring for the remaining occasions for search space set s within the duration.

In another example, when the UE monitors for search space set s based on a trigger (e.g., an assignment from the network), the search space set s can be indexed lower than other search space set indices to provide search space set a higher priority. Each search space set can have a given number of PDCCH candidates and the UE may not exceed a total number of blind detection attempts within a slot over the search space sets configured for the UE.

In another example, if search space set s is configured for an on-demand basis, search space set s can be configured with a higher priority. In another example, one or more other search space sets can be dropped in a given slot. In another example, search space set s can be configured for monitoring other DCI formats and periodicity. In another example, if a trigger is received, the UE can monitor the search space set s in successive slots with a periodicity that is larger than a slot. The parameter duration can be configured when a trigger is received. In another example, the UE can be configured for search space set s configuration with periodicity.

In another example, the duration of the search space set configuration can be active after receiving a DL assignment. The UE can monitor the search space set s following a configured periodicity. In one example, search space set s can include a periodicity of K (e.g., K=5 slots) and duration of m (e.g., m=2 slots). DL assignment can be received in DL slot n corresponding to a DL transmission that starts in DL slot n+j, wherein j can be determined based on the K0 parameter. In another example, the timing between the DL assignment and the corresponding DL data transmission can be indicated as part of the time-domain resource allocation. Duration can start after an offset of one slot (i.e. from DL slot n+I, wherein i can be less than or equal to j) and end at slot n+j. The UE can monitor search space set s according to a pattern within the slots n+i and n+j. The UE can resume monitoring search space set s in the next configured periodic occasion. The search space set configuration can be dynamically indicated or activated.

In another example, the search space set s may not be configured with duration. The UE can identify the duration for monitoring search space set s following the trigger. In one example, based on the length of PDSCH transmission, the UE can identify the end of the duration. In another example, the UE can monitor the set s after an offset with a periodicity of one slot according to the pattern and may not monitor after DL transmission ends.

In one example, the number of blind decoding attempts and/or the number of CCEs for channel estimation within a slot can be dynamically increased following a trigger. A search space set s following a trigger with a number of blind decoding attempts or control channel elements (CCEs) for channel estimation within a slot that is greater than the minimum numbers of blind decoding attempts and/or CCEs for channel estimation before the trigger was received. The UE can report a UE-NR-Capability if supported by the UE. Limits on the additional numbers of blind decoding (BD)/CCEs can be specified per slot as a function of the subcarrier spacing (SCS).

D. Resources for Retransmissions

In one example, for slot-based dynamic PDCCH or PDSCH repetitions, some or all scheduling configurations (e.g., time and/or frequency domain RA) from the first slot can be configured for repetitions in subsequent slots so that the UE may not monitor later DCIs if an earlier DCI has been decoded. In another example, slot-based repetitions can be configured in association with PDSCH mapping type A ("slot-based" scheduling).

In another example, mini-slot-based dynamic PDCCH or PDSCH repetitions can be configured in association with PDSCH mapping type B ("non-slot-based" scheduling), wherein the subsequent transmissions can include durations of 2, 4, or 7 symbols. In one example, the starting symbol of a retransmission (i.e. not the initial transmission) can be the next available DL symbol after the previous PDSCH.

In another example, the starting symbol of a PDSCH repetition can be based on a CORESET monitoring occasion and PDSCH, wherein each repetition can start after each monitoring occasion after the end of a previous PDSCH repetition, or each repetition can include the same starting symbol as the next monitoring occasion after the end of a previous PDSCH repetition.

2. UL Data Transmission and Compact DCI Format

In another example, data transmission can supported that operates on RRC configuration, while allowing L1 control signaling to configure the scheduling parameters or the parameters configured by RRC. The L1 signaling can be used for activation of such transmission. In another example, a compact DCI format can support L1 signaling.

In another example, fallback DCI formats (i.e. DCI formats 0_0 and 1_0, for PUSCH and PDSCH scheduling respectively) can reduce the DCI payload by removing or reducing various DCI fields through pre-configuration or scheduling flexibility reduction. In another example, the non-fallback DCI formats can reduce the DCI payload by removing or reducing various DCI fields through pre-configuration or scheduling flexibility reduction.

In another example, the DCI can be partitioned into two stages based on the contents: (1) the first DCI operation for RRC indication, and (2) the second DCI operation for activation.

In one example, periodicity and scheduling parameters beyond type 2 CG (e.g., number of repetitions and/or RV cycling sequence and/or power control related parameters) can be indicated by the first DCI operation.

In another example, instead of an RRC/DCI indication or an RRC signaling approach, a two-operation DCI can support hybrid scheduling that includes aspects of dynamic scheduling and SPS/Type 2 CG.

In another example, the first DCI operation can include less dynamic information, and the second DCI operation can contain more dynamic information. In one example, the second DCI operation can include compact DCI that carries some or all of the scheduling parameters.

In another example, a burst of transmission and reception opportunities can be triggered by a less frequent DCI (i.e., the first DCI operation), and a more frequent DCI (i.e., the second DCI operation) can trigger the actual transmissions.

In another example, the UL data transmission type can enable the updating of the transmission parameters in the middle of the repetition sequence, while continuing with other parameters for the remaining repetitions. In this example, early termination can be configured. In one example, a UE can receive L1 signaling to dynamically update a repetition number or a power control parameter. In another example, L1 signaling can indicate a value of a repetition number that can be less than the remaining number of repetitions (e.g., early termination of repetition) or can indicate an update in a power control parameter (e.g., if the network identifies an overlap of transmissions).

In another example, subsequent repetitions can be accompanied by PDCCH. In one example, once the transmissions are started, for the remaining subsequent transmissions of the same TB, the PDCCH can be appended to enable some of the transmission parameters.

Figure 4:
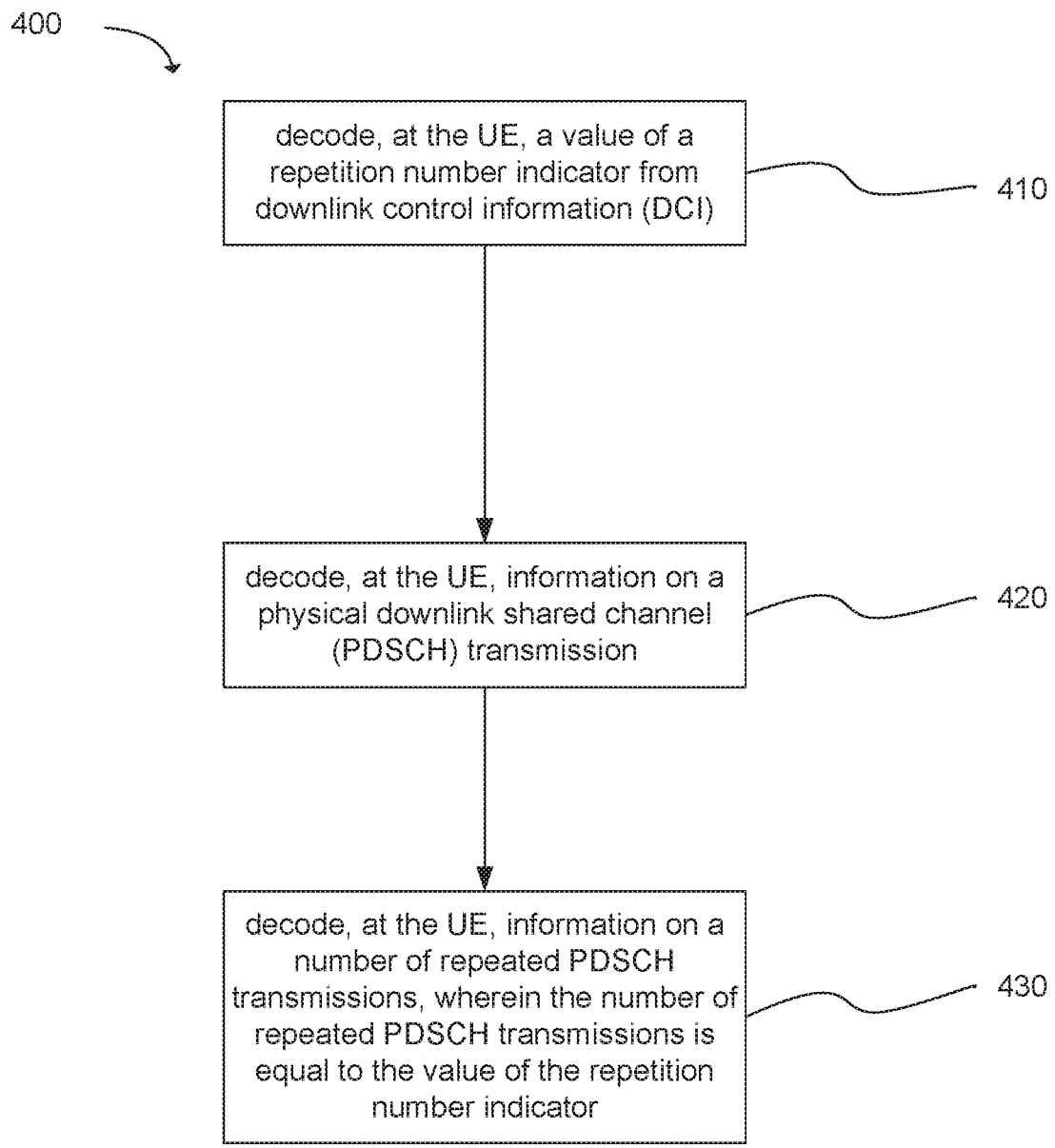
FIG. 4 depicts functionality of a user equipment (UE) operable for dynamic downlink (DL) control and data repetition for new radio (NR) ultra-reliable low-latency communication (URLLC) in accordance with an example.

Another example provides functionality 400 of a UE operable for dynamic downlink (DL) control and data repetition for new radio (NR) ultra-reliable low-latency communication (URLLC), as shown in FIG. 4. The UE can comprise one or more processors. The one or more processors can be configured to decode, at the UE, a value of a repetition number indicator from downlink control information (DCI), as in block 410. The one or more processors can be configured to decode, at the UE, information on a physical downlink shared channel (PDSCH) transmission, as in block 420. The one or more processors can be configured to decode, at the UE, information on a number of repeated PDSCH transmissions, wherein the number of repeated PDSCH transmissions is equal to the value of the repetition number indicator, as in block 430. In addition, the UE can comprise a memory interface configured to store the value of the repetition number indicator in a memory.

Figure 5:
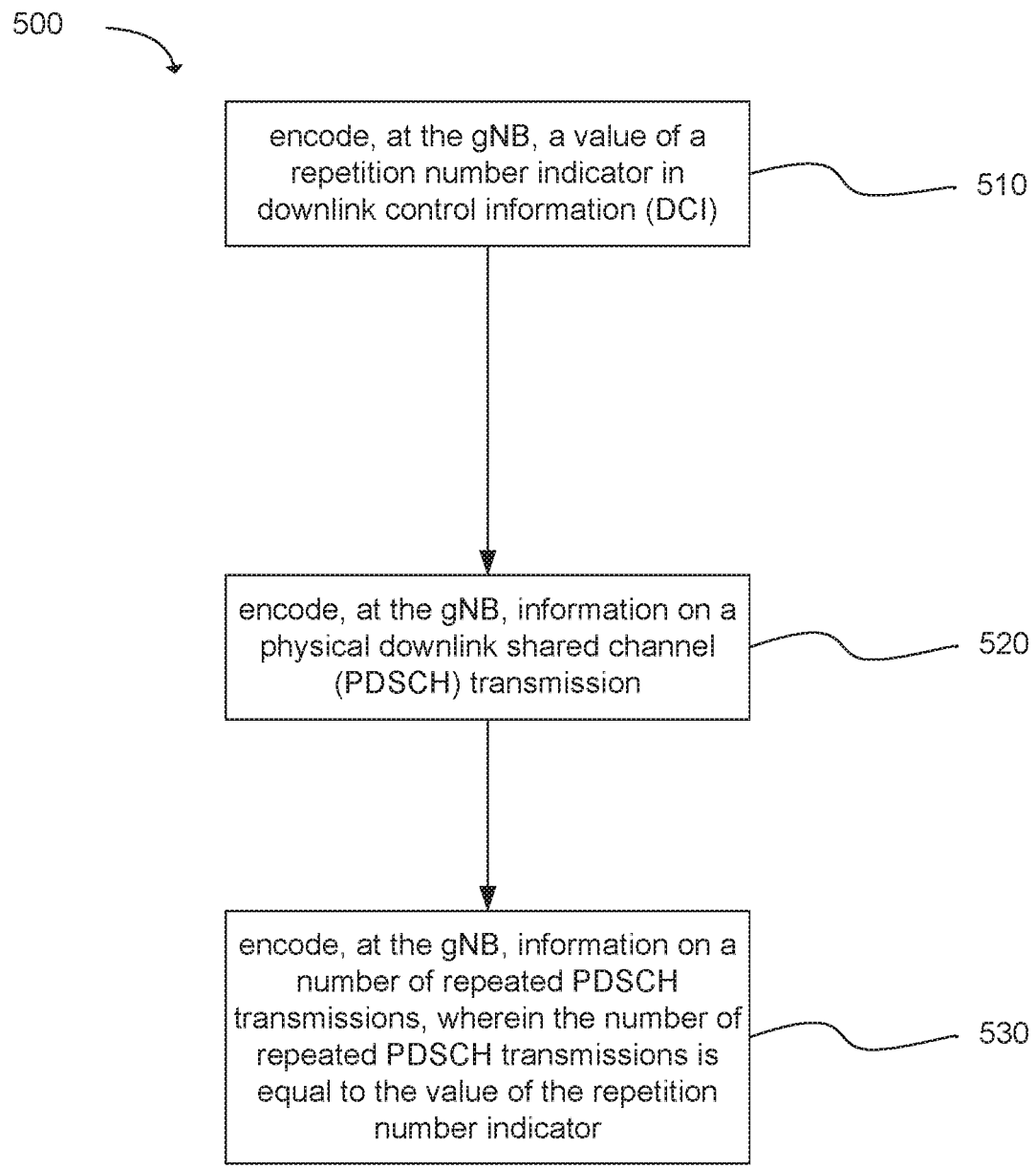
FIG. 5 depicts functionality of a new radio node B (gNB) operable for dynamic downlink (DL) control and data repetition for new radio (NR) ultra-reliable low-latency communication (URLLC) in accordance with an example.

Another example provides functionality 500 of a new radio node B (gNB) operable for dynamic downlink (DL) control and data repetition for new radio (NR) ultra-reliable low-latency communication (URLLC), as shown in FIG. 5. The gNB can comprise one or more processors. The one or more processors can be configured to encode, at the gNB, a value of a repetition number indicator in downlink control information (DCI), as in block 510. The one or more processors can be configured to encode, at the gNB, information on a physical downlink shared channel (PDSCH) transmission, as in block 520. The one or more processors can be configured to encode, at the gNB, information on a number of repeated PDSCH transmissions, wherein the number of repeated PDSCH transmissions is equal to the value of the repetition number indicator, as in block 530. In addition, the gNB can comprise a memory interface configured to store the value of the repetition number indicator in a memory.

Figure 6:
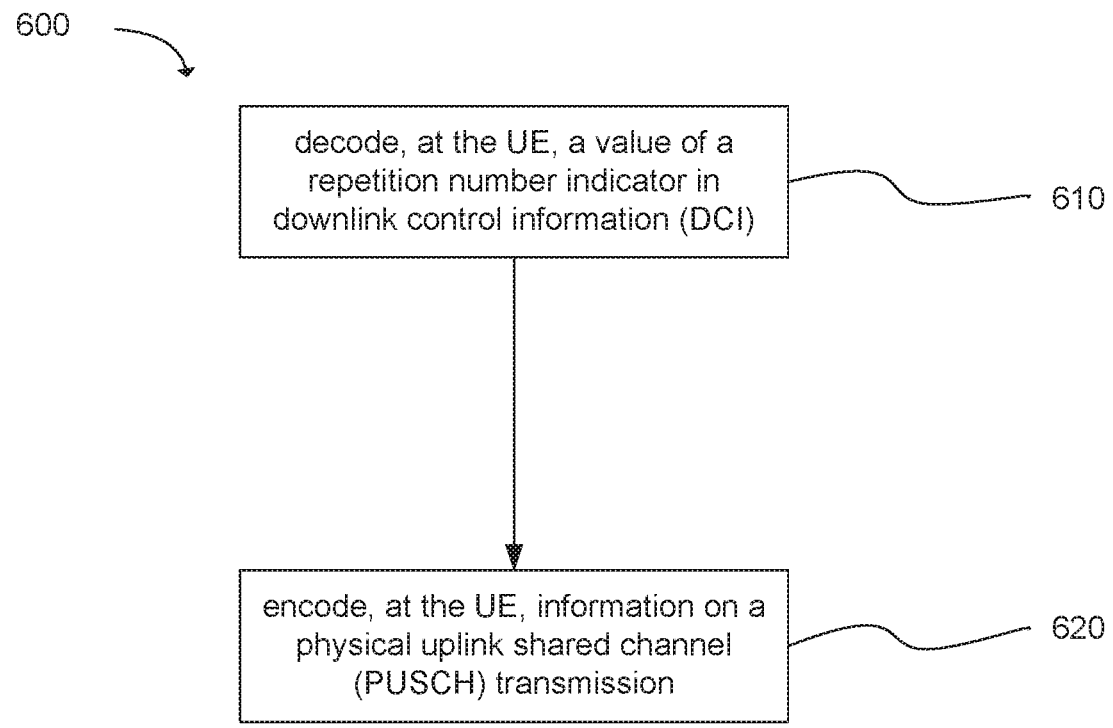
FIG. 6 depicts a flowchart of a machine-readable storage medium having instructions embodied thereon for a user equipment (UE) operable for dynamic uplink (UL) data repetition for new radio (NR) ultra-reliable low-latency communication (URLLC) in accordance with an example.

Another example provides functionality 600 of a user equipment (UE) operable for dynamic uplink (UL) data repetition for new radio (NR) ultra-reliable low-latency communication (URLLC), as shown in FIG. 6. The UE can comprise one or more processors. The one or more processors can be configured to decode, at the UE, a value of a repetition number indicator in downlink control information (DCI), as in block 610. The one or more processors can be configured to encode, at the UE, information on a physical uplink shared channel (PUSCH) transmission, as in block 620. In addition, the UE can comprise a memory interface configured to store the value of the repetition number indicator in a memory.

While examples have been provided in which a gNB has been specified, they are not intended to be limiting. An evolved node B (eNB) can be used in place of a next generation node B (gNB), a new radio node B (gNB), or a new radio base station (NR BS). Accordingly, unless otherwise stated, any example herein in which a gNB has been disclosed, can similarly be disclosed with the use of eNB or new radio base station (NR B S).

Figure 7:
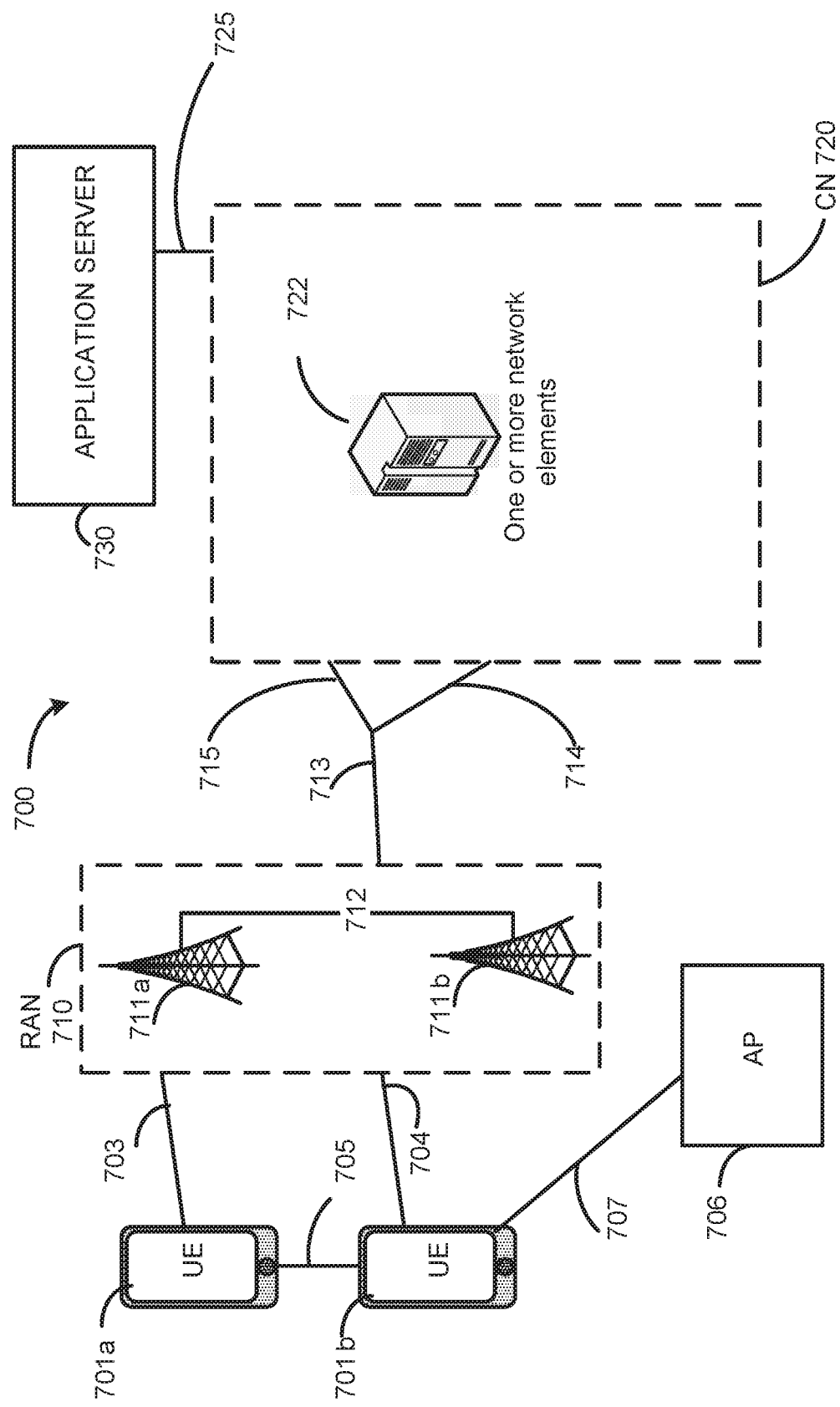
FIG. 7 illustrates an example architecture of a system of a network in accordance with an example.

FIG. 7 illustrates an example architecture of a system 700 of a network, in accordance with various embodiments. The following description is provided for an example system 700 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 7, the system 700 includes UE 701*a* and UE 701*b* (collectively referred to as "UEs 701" or "UE 701"). In this example, UEs 701 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (WI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 701 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 may be configured to connect, for example, communicatively couple, with an or RAN 710. In embodiments, the RAN 710 may be an NG RAN or a 5G RAN, an E-UTRAN, or a legacy RAN, such as a UTRAN or GERAN. As used herein, the term "NG RAN" or the like may refer to a RAN 710 that operates in an NR or 5G system 700, and the term "E-UTRAN" or the like may refer to a RAN 710 that operates in an LTE or 4G system 700. The UEs 701 utilize connections (or channels) 703 and 704, respectively, each of which comprises a physical communications interface or layer (discussed in further detail below).

In this example, the connections 703 and 704 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 701 may directly exchange communication data via a ProSe interface 705. The ProSe interface 705 may alternatively be referred to as a SL interface 705 and may comprise one or more logical channels, including but not limited to a PSCCH, a PSSCH, a PSDCH, and a PSBCH.

The UE 701b is shown to be configured to access an AP 706 (also referred to as "WLAN node 706," "WLAN 706," "WLAN Termination 706," "WT 706" or the like) via connection 707. The connection 707 can comprise a local wireless connection, such as a connection consistent with any IEEE 802.11 protocol, wherein the AP 706 would comprise a wireless fidelity (Wi-Fi®) router. In this example, the AP 706 is shown to be connected to the Internet without connecting to the core network of the wireless system (described in further detail below). In various embodiments, the UE 701b, RAN 710, and AP 706 may be configured to utilize LWA operation and/or LWIP operation. The LWA operation may involve the UE 701b in RRC_CONNECTED being configured by a RAN node 711a-b to utilize radio resources of LTE and WLAN. LWIP operation may involve the UE 701b using WLAN radio resources (e.g., connection 707) via IPsec protocol tunneling to authenticate and encrypt packets (e.g., IP packets) sent over the connection 707. IPsec tunneling may include encapsulating the entirety of original IP packets and adding a new packet header, thereby protecting the original header of the IP packets.

The RAN 710 can include one or more AN nodes or RAN nodes 711a and 711b (collectively referred to as "RAN nodes 711" or "RAN node 711") that enable the connections 703 and 704. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 711 that operates in an NR or 5G system 700 (for example, a gNB), and the term "E-UTRAN node" or the like may refer to a RAN node 711 that operates in an LTE or 4G system 700 (e.g., an eNB). According to various embodiments, the RAN nodes 711 may be implemented as one or more of a dedicated physical device such as a macrocell base station, and/or a low power (LP) base station for providing femtocells, picocells or other like cells having smaller coverage areas, smaller user capacity, or higher bandwidth compared to macro cells.

In some embodiments, all or parts of the RAN nodes 711 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes 711; a MAC/PHY split wherein RRC, PDCP, RLC, and MAC layers are operated by the CRAN/vBBUP and the PHY layer is operated by individual RAN nodes 711; or a "lower PHY" split wherein RRC, PDCP, RLC, MAC layers and upper portions of the PHY layer are operated by the CRAN/vBBUP and lower portions of the PHY layer are operated by individual RAN nodes 711. This virtualized framework allows the freed-up processor cores of the RAN nodes 711 to perform other virtualized applications. In some implementations, an individual RAN node 711 may represent individual gNB-DUs that are connected to a gNB-CU via individual F1 interfaces (not shown by FIG. 7). In these implementations, the gNB-DUs may include one or more remote radio heads or RFEMs, and the gNB-CU may be operated by a server that is located in the RAN 710 (not shown) or by a server pool in a similar manner as the CRAN/vBBUP. Additionally or alternatively, one or more of the RAN nodes 711 may be next generation eNBs (ng-eNBs), which are RAN nodes that provide E-UTRA user plane and control plane protocol terminations toward the UEs 701, and are connected to a 5GC via an NG interface (discussed infra).

In V2X scenarios one or more of the RAN nodes 711 may be or act as RSUs. The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs 701 (vUEs 701). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally or alternatively, the RSU may operate on the cellular V2X band to provide the aforementioned low latency communications, as well as other cellular communications services. Additionally or alternatively, the RSU may operate as a Wi-Fi hotspot (2.4 GHz band) and/or provide connectivity to one or more cellular networks to provide uplink and downlink communications. The computing device(s) and some or all of the radiofrequency circuitry of the RSU may be packaged in a weatherproof enclosure suitable for outdoor installation, and may include a network interface controller to provide a wired connection (e.g., Ethernet) to a traffic signal controller and/or a backhaul network.

Any of the RAN nodes 711 can terminate the air interface protocol and can be the first point of contact for the UEs 701. In some embodiments, any of the RAN nodes 711 can fulfill various logical functions for the RAN 710 including, but not limited to, radio network controller (RNC) functions such as radio bearer management, uplink and downlink dynamic radio resource management and data packet scheduling, and mobility management.

In embodiments, the UEs 701 can be configured to communicate using OFDM communication signals with each other or with any of the RAN nodes 711 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 to the UEs 701, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UEs 701 and the RAN nodes 711 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 701 and the RAN nodes 711 may operate using LAA, eLAA, and/or feLAA mechanisms. In these implementations, the UEs 701 and the RAN nodes 711 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 701 RAN nodes 711, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 701, AP 706, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as S Cells, and each SCell may provide an individual SCC for both UL and DL. The SCCs may be added and removed as required, while changing the PCC may require the UE 701 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 701. The PDCCH carries information about the transport format and resource allocations related to the PDSCH channel, among other things. It may also inform the UEs 701 about the transport format, resource allocation, and HARQ information related to the uplink shared channel. Typically, downlink scheduling (assigning control and shared channel resource blocks to the UE 701*b* within a cell) may be performed at any of the RAN nodes 711 based on channel quality information fed back from any of the UEs 701. The downlink resource assignment information may be sent on the PDCCH used for (e.g., assigned to) each of the UEs 701.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 711 may be configured to communicate with one another via interface 712. In embodiments where the system 700 is an LTE system, the interface 712 may be an X2 interface 712. The X2 interface may be defined between two or more RAN nodes 711 (e.g., two or more eNBs and the like) that connect to EPC 720, and/or between two eNBs connecting to EPC 720. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 701 from an SeNB for user data; information of PDCP PDUs that were not delivered to a UE 701; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 700 is a 5G or NR system, the interface 712 may be an Xn interface 712. The Xn interface is defined between two or more RAN nodes 711 (e.g., two or more gNBs and the like) that connect to 5GC 720, between a RAN node 711 (e.g., a gNB) connecting to 5GC 720 and an eNB, and/or between two eNBs connecting to 5GC 720. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 701 in a connected mode (e.g., CM-CONNECTED) including functionality to manage the UE mobility for connected mode between one or more RAN nodes 711. The mobility support may include context transfer from an old (source) serving RAN node 711 to new (target) serving RAN node 711; and control of user plane tunnels between old (source) serving RAN node 711 to new (target) serving RAN node 711. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 710 is shown to be communicatively coupled to a core network—in this embodiment, core network (CN) 720. The CN 720 may comprise a plurality of network elements 722, which are configured to offer various data and telecommunications services to customers/subscribers (e.g., users of UEs 701) who are connected to the CN 720 via the RAN 710. The components of the CN 720 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 720 may be referred to as a network slice, and a logical instantiation of a portion of the CN 720 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 730 may be an element offering applications that use IP bearer resources with the core network (e.g., UMTS PS domain, LTE PS data services, etc.). The application server 730 can also be configured to support one or more communication services (e.g., VoIP sessions, PTT sessions, group communication sessions, social networking services, etc.) for the UEs 701 via the EPC 720.

In embodiments, the CN 720 may be a 5GC (referred to as "5GC 720" or the like), and the RAN 710 may be connected with the CN 720 via an NG interface 713. In embodiments, the NG interface 713 may be split into two parts, an NG user plane (NG-U) interface 714, which carries traffic data between the RAN nodes 711 and a UPF, and the S1 control plane (NG-C) interface 715, which is a signaling interface between the RAN nodes 711 and AMFs.

In embodiments, the CN 720 may be a 5G CN (referred to as "5GC 720" or the like), while in other embodiments, the CN 720 may be an EPC). Where CN 720 is an EPC (referred to as "EPC 720" or the like), the RAN 710 may be connected with the CN 720 via an S1 interface 713. In embodiments, the S1 interface 713 may be split into two parts, an S1 user plane (S1-U) interface 714, which carries traffic data between the RAN nodes 711 and the S-GW, and the S1-MME interface 715, which is a signaling interface between the RAN nodes 711 and MMEs.

Figure 8:
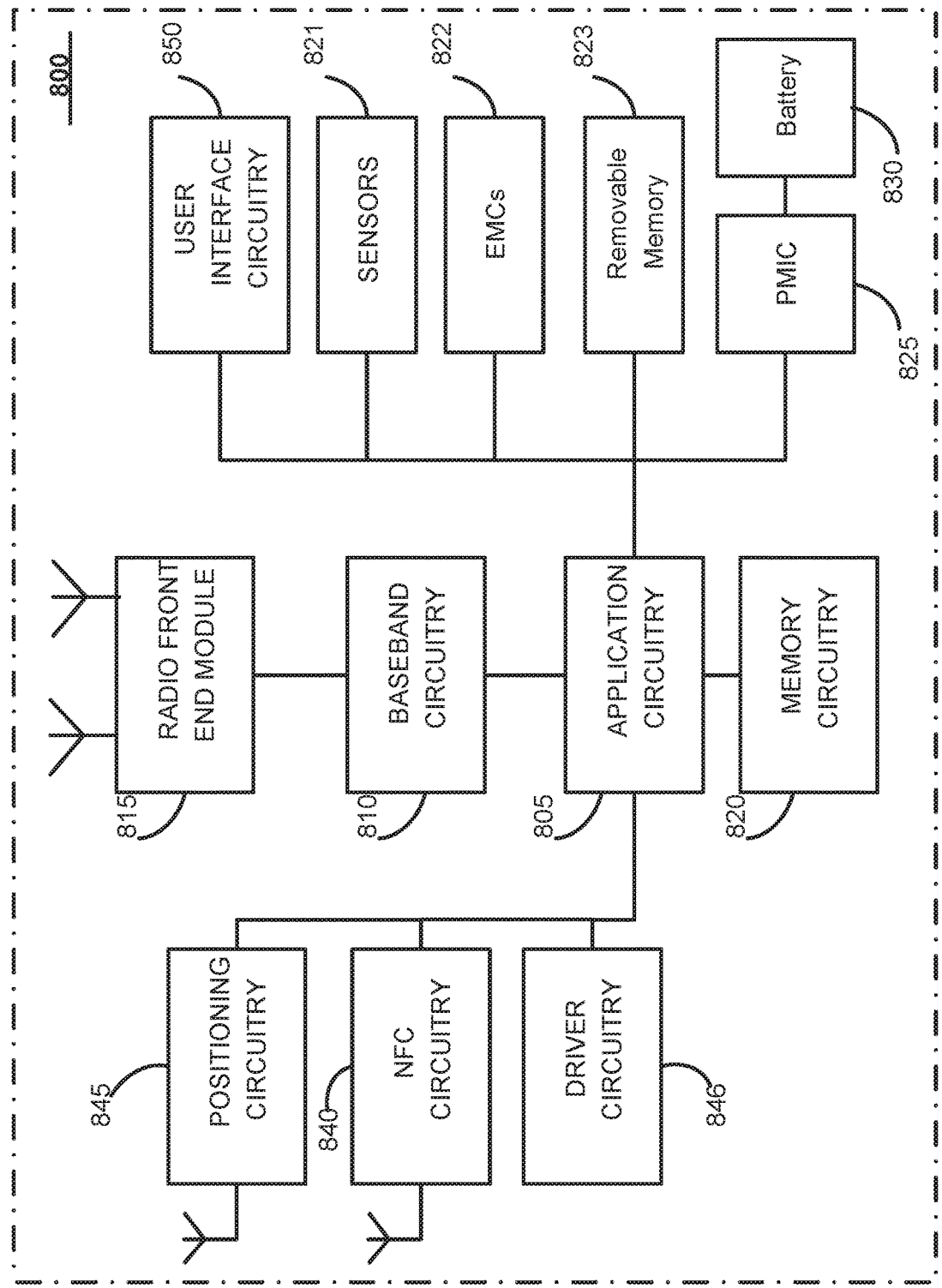
FIG. 8 illustrates an example of a platform or device in accordance with an example.

FIG. 8 illustrates an example of a platform 800 (or "device 800") in accordance with various embodiments. In embodiments, the computer platform 800 may be suitable for use as UEs 701, application servers 730, and/or any other element/device discussed herein. The platform 800 may include any combinations of the components shown in the example. The components of platform 800 may be implemented as integrated circuits (ICs), portions thereof, discrete electronic devices, or other modules, logic, hardware, software, firmware, or a combination thereof adapted in the computer platform 800, or as components otherwise incorporated within a chassis of a larger system. The block diagram of FIG. 8 is intended to show a high level view of components of the computer platform 800. However, some of the components shown may be omitted, additional components may be present, and different arrangement of the components shown may occur in other implementations.

Application circuitry 805 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 805 may be coupled with or may include memory/storage elements and may be configured to execute instructions stored in the memory/storage to enable various applications or operating systems to run on the platform 800. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry may comprise, or may be, a special-purpose processor/controller to operate according to the various embodiments herein.

As examples, the processor(s) of application circuitry 805 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 805 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 805 may be a part of a system on a chip (SoC) in which the application circuitry 805 and other components are formed into a single integrated circuit, or a single package, such as the Edison™ or Galileo™ SoC boards from Intel® Corporation.

Additionally or alternatively, application circuitry 805 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 805 may comprise logic blocks or logic fabric, and other interconnected resources that may be programmed to perform various functions, such as the procedures, methods, functions, etc. of the various embodiments discussed herein. In such embodiments, the circuitry of application circuitry 805 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 810 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 810 are discussed infra with regard to FIG. 9.

The RFEMs 815 may comprise a millimeter wave (mm-Wave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 911 of FIG. 9 infra), and the RFEM may be connected to multiple antennas. In alternative implementations, both mmWave and sub-mmWave radio functions may be implemented in the same physical RFEM 815, which incorporates both mmWave antennas and sub-mmWave.

The memory circuitry 820 may include any number and type of memory devices used to provide for a given amount of system memory. As examples, the memory circuitry 820 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 820 may be developed in accordance with a Joint Electron Devices Engineering Council (JEDEC) low power double data rate (LPDDR)-based design, such as LPDDR2, LPDDR3, LPDDR4, or the like. Memory circuitry 820 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 820 may be on-die memory or registers associated with the application circuitry 805. To provide for persistent storage of information such as data, applications, operating systems and so forth, memory circuitry 820 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 800 may incorporate the three-dimensional (3D) cross-point (XPOINT) memories from Intel® and Micron®.

Removable memory circuitry 823 may include devices, circuitry, enclosures/housings, ports or receptacles, etc. used to couple portable data storage devices with the platform 800. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 800 may also include interface circuitry (not shown) that is used to connect external devices with the platform 800. The external devices connected to the platform 800 via the interface circuitry include sensor circuitry 821 and electro-mechanical components (EMCs) 822, as well as removable memory devices coupled to removable memory circuitry 823.

The sensor circuitry 821 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 822 include devices, modules, or subsystems whose purpose is to enable platform 800 to change its state, position, and/or orientation, or move or control a mechanism or (sub)system. Additionally, EMCs 822 may be configured to generate and send messages/signalling to other components of the platform 800 to indicate a current state of the EMCs 822. Examples of the EMCs 822 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 800 is configured to operate one or more EMCs 822 based on one or more captured events and/or instructions or control signals received from a service provider and/or various clients.

In some implementations, the interface circuitry may connect the platform 800 with positioning circuitry 845. The positioning circuitry 845 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 845 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 845 may include a Micro-PNT IC that uses a master timing clock to perform position tracking/estimation without GNSS assistance. The positioning circuitry 845 may also be part of, or interact with, the baseband circuitry and/or RFEMs 815 to communicate with the nodes and components of the positioning network. The positioning circuitry 845 may also provide position data and/or time data to the application circuitry 805, which may use the data to synchronize operations with various infrastructure (e.g., radio base stations), for turn-by-turn navigation applications, or the like In some implementations, the interface circuitry may connect the platform 800 with Near-Field Communication (NFC) circuitry 840. NFC circuitry 840 is configured to provide contactless, short-range communications based on radio frequency identification (RFID) standards, wherein magnetic field induction is used to enable communication between NFC circuitry 840 and NFC-enabled devices external to the platform 800 (e.g., an "NFC touchpoint"). NFC circuitry 840 comprises an NFC controller coupled with an antenna element and a processor coupled with the NFC controller. The NFC controller may be a chip/IC providing NFC functionalities to the NFC circuitry 840 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 840, or initiate data transfer between the NFC circuitry 840 and another active NFC device (e.g., a smartphone or an NFC-enabled POS terminal) that is proximate to the platform 800.

The driver circuitry 846 may include software and hardware elements that operate to control particular devices that are embedded in the platform 800, attached to the platform 800, or otherwise communicatively coupled with the platform 800. The driver circuitry 846 may include individual drivers allowing other components of the platform 800 to interact with or control various input/output (I/O) devices that may be present within, or connected to, the platform 800. For example, driver circuitry 846 may include a display driver to control and allow access to a display device, a touchscreen driver to control and allow access to a touchscreen interface of the platform 800, sensor drivers to obtain sensor readings of sensor circuitry 821 and control and allow access to sensor circuitry 821, EMC drivers to obtain actuator positions of the EMCs 822 and/or control and allow access to the EMCs 822, a camera driver to control and allow access to an embedded image capture device, audio drivers to control and allow access to one or more audio devices.

The power management integrated circuitry (PMIC) 825 (also referred to as "power management circuitry 825") may manage power provided to various components of the platform 800. In particular, with respect to the baseband circuitry 810, the PMIC 825 may control power-source selection, voltage scaling, battery charging, or DC-to-DC conversion. The PMIC 825 may often be included when the platform 800 is capable of being powered by a battery 830, for example, when the device is included in a UE 701.

In some embodiments, the PMIC 825 may control, or otherwise be part of, various power saving mechanisms of the platform 800. For example, if the platform 800 is in an RRC_Connected state, where it is still connected to the RAN node as it expects to receive traffic shortly, then it may enter a state known as Discontinuous Reception Mode (DRX) after a period of inactivity. During this state, the platform 800 may power down for brief intervals of time and thus save power. If there is no data traffic activity for an extended period of time, then the platform 800 may transition off to an RRC_Idle state, where it disconnects from the network and does not perform operations such as channel quality feedback, handover, etc. The platform 800 goes into a very low power state and it performs paging where again it periodically wakes up to listen to the network and then powers down again. The platform 800 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 830 may power the platform 800, although in some examples the platform 800 may be mounted deployed in a fixed location, and may have a power supply coupled to an electrical grid. The battery 830 may be a lithium ion battery, a metal-air battery, such as a zinc-air battery, an aluminum-air battery, a lithium-air battery, and the like. In some implementations, such as in V2X applications, the battery 830 may be a typical lead-acid automotive battery.

In some implementations, the battery 830 may be a "smart battery," which includes or is coupled with a Battery Management System (BMS) or battery monitoring integrated circuitry. The BMS may be included in the platform 800 to track the state of charge (SoCh) of the battery 830. The BMS may be used to monitor other parameters of the battery 830 to provide failure predictions, such as the state of health (SoH) and the state of function (SoF) of the battery 830. The BMS may communicate the information of the battery 830 to the application circuitry 805 or other components of the platform 800. The BMS may also include an analog-to-digital (ADC) convertor that allows the application circuitry 805 to directly monitor the voltage of the battery 830 or the current flow from the battery 830. The battery parameters may be used to determine actions that the platform 800 may perform, such as transmission frequency, network operation, sensing frequency, and the like.

A power block, or other power supply coupled to an electrical grid may be coupled with the BMS to charge the battery 830. In some examples, the power block may be replaced with a wireless power receiver to obtain the power wirelessly, for example, through a loop antenna in the computer platform 800. In these examples, a wireless battery charging circuit may be included in the BMS. The specific charging circuits chosen may depend on the size of the battery 830, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 850 includes various input/output (I/O) devices present within, or connected to, the platform 800, and includes one or more user interfaces designed to enable user interaction with the platform 800 and/or peripheral component interfaces designed to enable peripheral component interaction with the platform 800. The user interface circuitry 850 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 800. The output device circuitry may also include speakers or other audio emitting devices, printer(s), and/or the like. In some embodiments, the sensor circuitry 821 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 800 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 9:
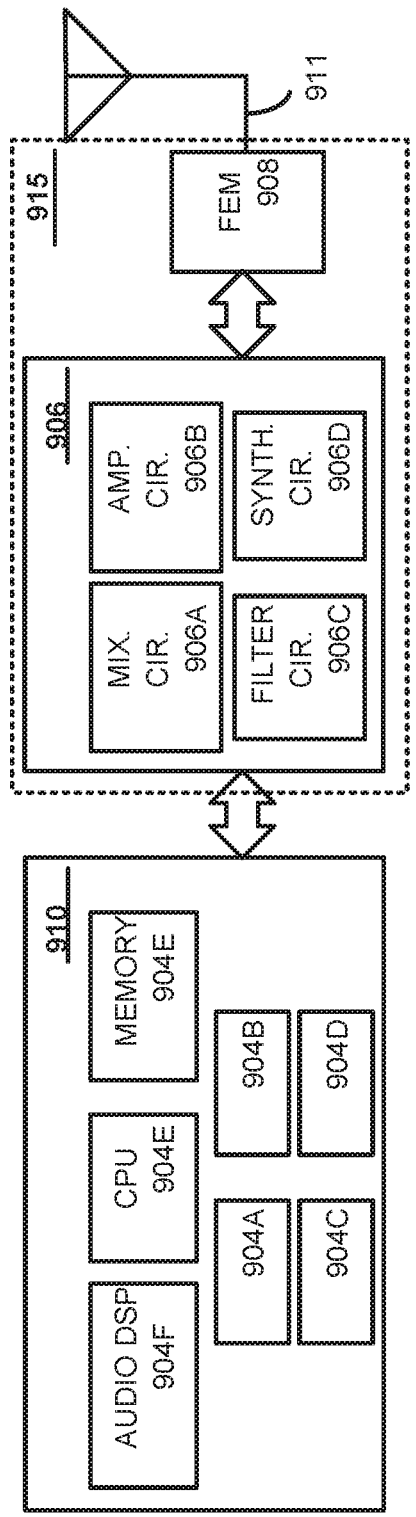
FIG. 9 illustrates example components of baseband circuitry and radio front end modules (RFEM) in accordance with an example.

FIG. 9 illustrates example components of baseband circuitry 910 and radio front end modules (RFEM) 915 in accordance with various embodiments. The baseband circuitry 910 corresponds to the baseband circuitry 810 of FIG. 8, respectively. The RFEM 915 corresponds to the RFEM 815 of FIG. 8, respectively. As shown, the RFEMs 915 may include Radio Frequency (RF) circuitry 906, front-end module (FEM) circuitry 908, antenna array 911 coupled together at least as shown.

The baseband circuitry 910 includes circuitry and/or control logic configured to carry out various radio/network protocol and radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 910 may include Fast-Fourier Transform (FFT), precoding, or constellation mapping/demapping functionality. In some embodiments, encoding/decoding circuitry of the baseband circuitry 910 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 910 is configured to process baseband signals received from a receive signal path of the RF circuitry 906 and to generate baseband signals for a transmit signal path of the RF circuitry 906. The baseband circuitry 910 is configured to interface with application circuitry 805 (see FIG. 8) for generation and processing of the baseband signals and for controlling operations of the RF circuitry 906. The baseband circuitry 910 may handle various radio control functions.

The aforementioned circuitry and/or control logic of the baseband circuitry 910 may include one or more single or multi-core processors. For example, the one or more processors may include a 3G baseband processor 904A, a 4G/LTE baseband processor 904B, a 5G/NR baseband processor 904C, or some other baseband processor(s) 904D for other existing generations, generations in development or to be developed in the future (e.g., sixth generation (6G), etc.). In other embodiments, some or all of the functionality of baseband processors 904A-D may be included in modules stored in the memory 904G and executed via a Central Processing Unit (CPU) 904E. In other embodiments, some or all of the functionality of baseband processors 904A-D may be provided as hardware accelerators (e.g., FPGAs, ASICs, etc.) loaded with the appropriate bit streams or logic blocks stored in respective memory cells. In various embodiments, the memory 904G may store program code of a real-time OS (RTOS), which when executed by the CPU 904E (or other baseband processor), is to cause the CPU 904E (or other baseband processor) to manage resources of the baseband circuitry 910, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 910 includes one or more audio digital signal processor(s) (DSP) 904F. The audio DSP(s) 904F include elements for compression/decompression and echo cancellation and may include other suitable processing elements in other embodiments.

In some embodiments, each of the processors 904A-904E include respective memory interfaces to send/receive data to/from the memory 904G. The baseband circuitry 910 may further include one or more interfaces to communicatively couple to other circuitries/devices, such as an interface to send/receive data to/from memory external to the baseband circuitry 910; an application circuitry interface to send/receive data to/from the application circuitry 805 of FIG. 9); an RF circuitry interface to send/receive data to/from RF circuitry 906 of FIG. 9; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 825.

In alternate embodiments (which may be combined with the above described embodiments), baseband circuitry 910 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 910 may include protocol processing circuitry with one or more instances of control circuitry (not shown) to provide control functions for the digital baseband circuitry and/or radio frequency circuitry (e.g., the radio front end modules 915).

Although not shown by FIG. 9, in some embodiments, the baseband circuitry 910 includes individual processing device(s) to operate one or more wireless communication protocols (e.g., a "multi-protocol baseband processor" or "protocol processing circuitry") and individual processing device(s) to implement PI-TY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 910 and/or RF circuitry 906 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 910 and/or RF circuitry 906 are part of a Wi-Fi communication system. In the second example, the protocol processing circuitry would operate Wi-Fi MAC and logical link control (LLC) functions. The protocol processing circuitry may include one or more memory structures (e.g., 904G) to store program code and data for operating the protocol functions, as well as one or more processing cores to execute the program code and perform various operations using the data. The baseband circuitry 910 may also support radio communications for more than one wireless protocol.

The various hardware elements of the baseband circuitry 910 discussed herein may be implemented, for example, as a solder-down substrate including one or more integrated circuits (ICs), a single packaged IC soldered to a main circuit board or a multi-chip module containing two or more ICs. In one example, the components of the baseband circuitry 910 may be suitably combined in a single chip or chipset, or disposed on a same circuit board. In another example, some or all of the constituent components of the baseband circuitry 910 and RF circuitry 906 may be implemented together such as, for example, a system on a chip (SoC) or System-in-Package (SiP). In another example, some or all of the constituent components of the baseband circuitry 910 may be implemented as a separate SoC that is communicatively coupled with and RF circuitry 906 (or multiple instances of RF circuitry 906). In yet another example, some or all of the constituent components of the baseband circuitry 910 and the application circuitry 805 may be implemented together as individual SoCs mounted to a same circuit board (e.g., a "multi-chip package").

In some embodiments, the baseband circuitry 910 may provide for communication compatible with one or more radio technologies. For example, in some embodiments, the baseband circuitry 910 may support communication with an E-UTRAN or other WMAN, a WLAN, a WPAN. Embodiments in which the baseband circuitry 910 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path, which may include circuitry to down-convert RF signals received from the FEM circuitry 908 and provide baseband signals to the baseband circuitry 910. RF circuitry 906 may also include a transmit signal path, which may include circuitry to up-convert baseband signals provided by the baseband circuitry 910 and provide RF output signals to the FEM circuitry 908 for transmission.

In some embodiments, the receive signal path of the RF circuitry 906 may include mixer circuitry 906*a*, amplifier circuitry 906*b* and filter circuitry 906*c*. In some embodiments, the transmit signal path of the RF circuitry 906 may include filter circuitry 906*c* and mixer circuitry 906*a*. RF circuitry 906 may also include synthesizer circuitry 906*d* for synthesizing a frequency for use by the mixer circuitry 906*a* of the receive signal path and the transmit signal path. In some embodiments, the mixer circuitry 906*a* of the receive signal path may be configured to down-convert RF signals received from the FEM circuitry 908 based on the synthesized frequency provided by synthesizer circuitry 906*d*. The amplifier circuitry 906*b* may be configured to amplify the down-converted signals and the filter circuitry 906*c* may be a low-pass filter (LPF) or band-pass filter (BPF) configured to remove unwanted signals from the down-converted signals to generate output baseband signals. Output baseband signals may be provided to the baseband circuitry 910 for further processing. In some embodiments, the output baseband signals may be zero-frequency baseband signals, although this is not a requirement. In some embodiments, mixer circuitry 906*a* of the receive signal path may comprise passive mixers, although the scope of the embodiments is not limited in this respect.

In some embodiments, the mixer circuitry 906*a* of the transmit signal path may be configured to up-convert input baseband signals based on the synthesized frequency provided by the synthesizer circuitry 906*d* to generate RF output signals for the FEM circuitry 908. The baseband signals may be provided by the baseband circuitry 910 and may be filtered by filter circuitry 906*c*.

In some embodiments, the mixer circuitry 906*a* of the receive signal path and the mixer circuitry 906*a* of the transmit signal path may include two or more mixers and may be arranged for quadrature downconversion and upconversion, respectively. In some embodiments, the mixer circuitry 906*a* of the receive signal path and the mixer circuitry 906*a* of the transmit signal path may include two or more mixers and may be arranged for image rejection (e.g., Hartley image rejection). In some embodiments, the mixer circuitry 906*a* of the receive signal path and the mixer circuitry 906*a* of the transmit signal path may be arranged for direct downconversion and direct upconversion, respectively. In some embodiments, the mixer circuitry 906*a* of the receive signal path and the mixer circuitry 906*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 910 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906*d* may be a fractional-N synthesizer or a fractional N/N+1 synthesizer, although the scope of the embodiments is not limited in this respect as other types of frequency synthesizers may be suitable. For example, synthesizer circuitry 906*d* may be a delta-sigma synthesizer, a frequency multiplier, or a synthesizer comprising a phase-locked loop with a frequency divider.

The synthesizer circuitry 906*d* may be configured to synthesize an output frequency for use by the mixer circuitry 906*a* of the RF circuitry 906 based on a frequency input and a divider control input. In some embodiments, the synthesizer circuitry 906*d* may be a fractional N/N+1 synthesizer.

In some embodiments, frequency input may be provided by a voltage controlled oscillator (VCO), although that is not a requirement. Divider control input may be provided by either the baseband circuitry 910 or the application circuitry 805 depending on the desired output frequency. In some embodiments, a divider control input (e.g., N) may be determined from a look-up table based on a channel indicated by the application circuitry 805.

Synthesizer circuitry 906*d* of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path, which may include circuitry configured to operate on RF signals received from antenna array 911, amplify the received signals and provide the amplified versions of the received signals to the RF circuitry 906 for further processing. FEM circuitry 908 may also include a transmit signal path, which may include circuitry configured to amplify signals for transmission provided by the RF circuitry 906 for transmission by one or more of antenna elements of antenna array 911. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission by one or more antenna elements of the antenna array 911.

The antenna array 911 comprises one or more antenna elements, each of which is configured convert electrical signals into radio waves to travel through the air and to convert received radio waves into electrical signals. For example, digital baseband signals provided by the baseband circuitry 910 is converted into analog RF signals (e.g., modulated waveform) that will be amplified and transmitted via the antenna elements of the antenna array 911 including one or more antenna elements (not shown). The antenna elements may be omnidirectional, direction, or a combination thereof. The antenna elements may be formed in a multitude of arranges as are known and/or discussed herein. The antenna array 911 may comprise microstrip antennas or printed antennas that are fabricated on the surface of one or more printed circuit boards. The antenna array 911 may be formed in as a patch of metal foil (e.g., a patch antenna) in a variety of shapes, and may be coupled with the RF circuitry 906 and/or FEM circuitry 908 using metal transmission lines or the like.

Processors of the application circuitry 805 and processors of the baseband circuitry 910 may be used to execute elements of one or more instances of a protocol stack. For example, processors of the baseband circuitry 910, alone or in combination, may be used execute Layer 3, Layer 2, or Layer 1 functionality, while processors of the application circuitry 805 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail below.

Figure 10:
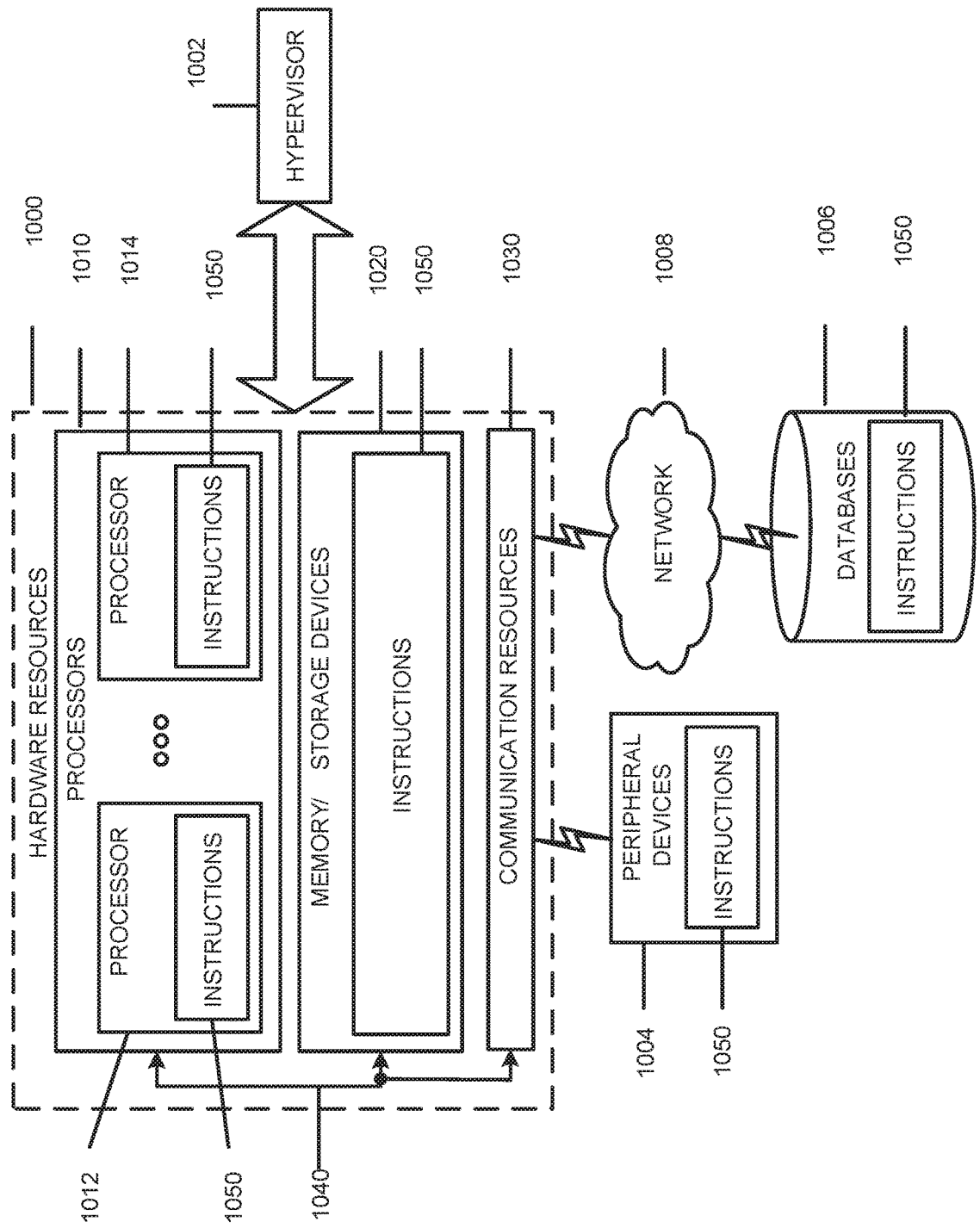
FIG. 10 is a block diagram illustrating components able to read instructions from a machine-readable or computer-readable medium in accordance with an example.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 may include, for example, a processor 1012 and a processor 1014. The processor(s) 1010 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1020 may include main memory, disk storage, or any suitable combination thereof. The memory/storage devices 1020 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via USB), cellular communication components, NFC components, Bluetooth® (or Bluetooth® Low Energy) components, Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Figure 11:
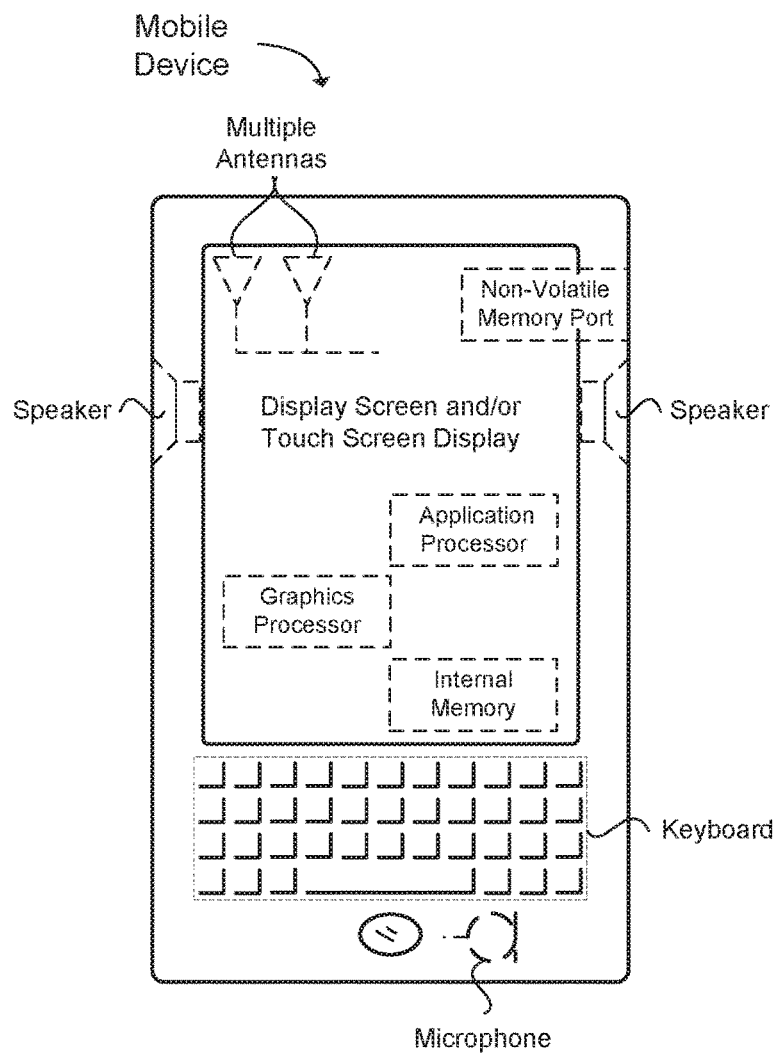
FIG. 11 illustrates a diagram of a wireless device (e.g., UE) in accordance with an example.

FIG. 11 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 11 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

The following examples pertain to specific technology embodiments and point out specific features, elements, or actions that can be used or otherwise combined in achieving such embodiments.

Example 1 includes an apparatus of a user equipment (UE) operable for dynamic downlink (DL) control and data repetition for new radio (NR) ultra-reliable low-latency communication (URLLC), the apparatus comprising: one or more processors configured to: decode, at the UE, a value of a repetition number indicator from downlink control information (DCI); decode, at the UE, information on a physical downlink shared channel (PDSCH) transmission; and decode, at the UE, information on a number of repeated PDSCH transmissions, wherein the number of repeated PDSCH transmissions is equal to the value of the repetition number indicator; and a memory interface configured to store the value of the repetition number indicator in a memory.

Example 2 includes the apparatus of Example 1, wherein the repetition number indicator is configured via UE-specific radio resource control (RRC) signaling.

Example 3 includes the apparatus of Example 1, wherein the one or more processors are further configured to: decode, at the UE, a maximum number of repetitions via radio resource control (RRC) signaling.

Example 4 includes the apparatus of Example 1, wherein the one or more processors are further configured to: decode, at the UE, a remaining number of repetitions from a subsequent DCI, wherein the remaining number of repetitions is selected from a set including: {1, 2, 3, 4}.

Example 5 includes the apparatus of Example 1, wherein the one or more processors are further configured to: monitor, at the UE, a first beam in frequency range 2 (FR2) from a first panel and a second beam in FR2 from a second panel, wherein one or more symbols on a first repeated PDSCH transmission of the number of repeated PDSCH transmissions and one or more symbols on a second repeated PDSCH transmission of the number of repeated PDSCH transmissions overlap in a time-domain.

Example 6 includes the apparatus of Example 1, wherein the one or more processors are further configured to: decode, at the UE, the information on the PDSCH transmission from a first transmission configuration indicator (TCI) state.

Example 7 includes the apparatus of Example 6, wherein the one or more processors are further configured to: decode, at the UE, the information on a repeated PDSCH transmission from the number of repeated PDSCH transmissions from a second TCI state, wherein the first TCI state and the second TCI state are different TCI states.

Example 8 includes the apparatus of any of Examples 1 to 6, wherein the one or more processors are further configured to: terminate, at the UE, monitoring of information on a remaining number of repeated PDSCH transmissions of the number of repeated PDSCH transmissions when a repeated PDSCH transmission of the number of repeated PDSCH transmissions is decoded.

Example 9 includes an apparatus of a new radio node B (gNB) operable for dynamic downlink (DL) control and data repetition for new radio (NR) ultra-reliable low-latency communication (URLLC), the apparatus comprising: one or more processors configured to: encode, at the gNB, a value of a repetition number indicator in downlink control information (DCI); encode, at the gNB, information on a physical downlink shared channel (PDSCH) transmission; and encode, at the gNB, information on a number of repeated PDSCH transmissions, wherein the number of repeated PDSCH transmissions is equal to the value of the repetition number indicator; and a memory interface configured to store the value of the repetition number indicator in a memory.

Example 10 includes the apparatus of Example 9, wherein the repetition number indicator is configured via UE-specific radio resource control (RRC) signaling.

Example 11 includes the apparatus of Example 9, wherein the one or more processors are further configured to: encode, at the gNB, a maximum number of repetitions via radio resource control (RRC) signaling.

Example 12 includes the apparatus of Example 9, wherein the one or more processors are further configured to: encode, at the gNB, a remaining number of repetitions in a subsequent DCI, wherein the remaining number of repetitions is selected from a set including: {1, 2, 3, 4}.

Example 13 includes the apparatus of Example 9, wherein the one or more processors are further configured to: encode, at the gNB, a first beam in frequency range 2 (FR2) from a first panel and a second beam in FR2 from a second panel, wherein one or more symbols on a first repeated PDSCH transmission of the number of repeated PDSCH transmissions and one or more symbols on a second repeated PDSCH transmission of the number of repeated PDSCH transmissions overlap in a time-domain.

Example 14 includes the apparatus of Example 9, wherein the one or more processors are further configured to: encode, at the gNB, the information on the PDSCH transmission from a first transmission configuration indicator (TCI) state.

Example 15 includes the apparatus of Example 14, wherein the one or more processors are further configured to: encode, at the gNB, the information on a repeated PDSCH transmission from the number of repeated PDSCH transmissions from a second TCI state, wherein the first TCI state and the second TCI state are different TCI states.

Example 16 includes an apparatus of a user equipment (UE) operable for dynamic uplink (UL) data repetition for new radio (NR) ultra-reliable low-latency communication (URLLC), the apparatus comprising: one or more processors configured to: decode, at the UE, a value of a repetition number indicator in downlink control information (DCI); and encode, at the UE, information on a physical uplink shared channel (PUSCH) transmission; and a memory interface configured to store the value of the repetition number indicator in a memory.

Example 17 includes the apparatus of Example 16, wherein the repetition number indicator is configured via UE-specific radio resource control (RRC) signaling.

Example 18 includes the apparatus of Example 16, wherein the one or more processors are further configured to: decode, at the UE, a maximum number of repetitions via radio resource control (RRC) signaling.

Example 19 includes the apparatus of Example 16, wherein the one or more processors are further configured to: decode, at the UE, a remaining number of repetitions in a subsequent DCI, wherein the remaining number of repetitions is selected from a set including: {1, 2, 3, 4}.

Example 20 includes the apparatus of any of Examples 16 to 19, wherein encode, at the UE, the information on the PUSCH transmission from a first transmission configuration indicator (TCI) state; and encode, at the UE, the information on a repeated PUSCH transmission from the number of repeated PUSCH transmissions from a second TCI state, wherein the first TCI state and the second TCI state are different TCI states.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable for dynamic downlink (DL) control and data repetition for new radio (NR) ultra-reliable low-latency communication (URLLC), the apparatus comprising:
one or more processors configured to:
  decode, at the UE, a value of a repetition number indicator from downlink control information (DCI);
  decode, at the UE, information on a physical downlink shared channel (PDSCH) transmission;
  decode, at the UE, information on a number of repeated PDSCH transmissions, wherein the number of repeated PDSCH transmissions is equal to the value of the repetition number indicator; and
  monitor, at the UE, a first beam in frequency range 2 (FR2) from a first panel and a second beam in FR2 from a second panel, wherein one or more symbols on a first repeated PDSCH transmission of the number of repeated PDSCH transmissions and one or more symbols on a second repeated PDSCH transmission of the number of repeated PDSCH transmissions overlap in a time-domain; and
a memory interface configured to store the value of the repetition number indicator in a memory.

2. The apparatus of claim 1, wherein the repetition number indicator is configured via UE-specific radio resource control (RRC) signaling.

3. The apparatus of claim 1, wherein the one or more processors are further configured to:
  decode, at the UE, a maximum number of repetitions via radio resource control (RRC) signaling.

4. The apparatus of claim 1, wherein the one or more processors are further configured to:
  decode, at the UE, a remaining number of repetitions from a subsequent DCI, wherein the remaining number of repetitions is selected from a set including: $\{1, 2, 3, 4\}$.

5. The apparatus of claim 1, wherein the one or more processors are further configured to:
  decode, at the UE, the information on the PDSCH transmission from a first transmission configuration indicator (TCI) state.

6. The apparatus of claim 5, wherein the one or more processors are further configured to:
  decode, at the UE, the information on a repeated PDSCH transmission from the number of repeated PDSCH transmissions from a second TCI state, wherein the first TCI state and the second TCI state are different TCI states.

7. The apparatus of claim 1, wherein the one or more processors are further configured to:
  terminate, at the UE, monitoring of information on a remaining number of repeated PDSCH transmissions of the number of repeated PDSCH transmissions when a repeated PDSCH transmission of the number of repeated PDSCH transmissions is decoded.

8. An apparatus of a base station operable for dynamic downlink (DL) control and data repetition for new radio (NR) ultra-reliable low-latency communication (URLLC), the apparatus comprising:
one or more processors configured to:
  encode, at the base station, a value of a repetition number indicator in downlink control information (DCI);
  encode, at the base station, information on a physical downlink shared channel (PDSCH) transmission;
  encode, at the base station, information on a number of repeated PDSCH transmissions, wherein the number of repeated PDSCH transmissions is equal to the value of the repetition number indicator; and
  encode, at the base station, a first beam in frequency range 2 (FR2) from a first panel and a second beam in FR2 from a second panel, wherein one or more symbols on a first repeated PDSCH transmission of the number of repeated PDSCH transmissions and one or more symbols on a second repeated PDSCH transmission of the number of repeated PDSCH transmissions overlap in a time-domain; and a memory interface configured to store the value of the repetition number indicator in a memory.

9. The apparatus of claim 8, wherein the repetition number indicator is configured via UE-specific radio resource control (RRC) signaling.

10. The apparatus of claim 8, wherein the one or more processors are further configured to:

encode, at the base station, a maximum number of repetitions via radio resource control (RRC) signaling.

11. The apparatus of claim 8, wherein the one or more processors are further configured to:

encode, at the base station, a remaining number of repetitions in a subsequent DCI, wherein the remaining number of repetitions is selected from a set including: {1, 2, 3, 4}.

12. The apparatus of claim 8, wherein the one or more processors are further configured to:

encode, at the base station, the information on the PDSCH transmission from a first transmission configuration indicator (TCI) state.

13. The apparatus of claim 12, wherein the one or more processors are further configured to:

encode, at the base station, the information on a repeated PDSCH transmission from the number of repeated PDSCH transmissions from a second TCI state, wherein the first TCI state and the second TCI state are different TCI states.

14. A non-transitory machine-readable storage medium comprising instructions that, when executed by one or more processors of a user equipment (UE), cause the UE to:

decode, at the UE, a value of a repetition number indicator from downlink control information (DCI);

decode, at the UE, information on a physical downlink shared channel (PDSCH) transmission;

decode, at the UE, information on a number of repeated PDSCH transmissions, wherein the number of repeated PDSCH transmissions is equal to the value of the repetition number indicator; and monitor, at the UE, a first beam in frequency range 2 (FR2) from a first panel and a second beam in FR2 from a second panel, wherein one or more symbols on a first repeated PDSCH transmission of the number of repeated PDSCH transmissions and one or more symbols on a second repeated PDSCH transmission of the number of repeated PDSCH transmissions overlap in a time-domain.

15. The non-transitory machine-readable storage medium of claim 14, wherein the repetition number indicator is configured via UE-specific radio resource control (RRC) signaling.

16. The non-transitory machine-readable storage medium of claim 14, wherein the one or more processors are further configured to:

decode, at the UE, a maximum number of repetitions via radio resource control (RRC) signaling.

17. The non-transitory machine-readable storage medium of claim 14, wherein the one or more processors are further configured to:

decode, at the UE, a remaining number of repetitions from a subsequent DCI, wherein the remaining number of repetitions is selected from a set including: {1, 2, 3, 4}.

18. The non-transitory machine-readable storage medium of claim 14, wherein the one or more processors are further configured to:

decode, at the UE, the information on the PDSCH transmission from a first transmission configuration indicator (TCI) state.

19. The apparatus of non-transitory machine-readable storage medium 25, wherein the one or more processors are further configured to:

decode, at the UE, the information on a repeated PDSCH transmission from the number of repeated PDSCH transmissions from a second TCI state, wherein the first TCI state and the second TCI state are different TCI states.

20. The non-transitory machine-readable storage medium of claim 14, wherein the one or more processors are further configured to:

terminate, at the UE, monitoring of information on a remaining number of repeated PDSCH transmissions of the number of repeated PDSCH transmissions when a repeated PDSCH transmission of the number of repeated PDSCH transmissions is decoded.

* * * * *